United States Patent [19]
Leisten et al.

[11] Patent Number: 6,023,702
[45] Date of Patent: Feb. 8, 2000

[54] METHOD AND APPARATUS FOR A PROCESS AND PROJECT MANAGEMENT COMPUTER SYSTEM

[75] Inventors: Udo Leisten, Stuttgart; Ekkehard Voesch, Aidlingen, both of Germany; Geoff Parncutt, Lillington, United Kingdom; Kurt Bandat, Vienna, Austria

[73] Assignee: International Business Machines Corporation, Armonk, N.Y.

[21] Appl. No.: 08/765,848

[22] PCT Filed: Aug. 18, 1995

[86] PCT No.: PCT/EP95/03289

§ 371 Date: Dec. 10, 1998

§ 102(e) Date: Dec. 10, 1998

[87] PCT Pub. No.: WO97/07472

PCT Pub. Date: Feb. 27, 1997

[51] Int. Cl.[7] .................................................. G06F 17/30
[52] U.S. Cl. ........................... 707/100; 707/101; 707/102
[58] Field of Search .................................. 707/1, 2, 3, 4, 707/5, 6, 100, 200; 705/7; 395/840; 364/488

[56] References Cited

U.S. PATENT DOCUMENTS

| | | | |
|---|---|---|---|
| 4,484,289 | 11/1984 | Hemond | 364/468.2 |
| 4,503,499 | 3/1985 | Mason et al. | 395/671 |
| 5,040,142 | 8/1991 | Mori et al. | 707/511 |
| 5,233,513 | 8/1993 | Doyle | 705/7 |
| 5,392,220 | 2/1995 | Hamer et al. | 364/488 |
| 5,418,942 | 5/1995 | Krawchuk et al. | 707/3 |
| 5,564,119 | 10/1996 | Krawchuk et al. | 707/4 |
| 5,566,349 | 10/1996 | Trout | 395/840 |
| 5,675,745 | 10/1997 | Oku et al. | 1/1 |

FOREIGN PATENT DOCUMENTS

WO 94/18620  8/1994  European Pat. Off. .

OTHER PUBLICATIONS

Workgroup Computing Report, vol. 17,No. 5, May 1994, R.T. Marshak, "IBM's Flowmark Object–Oriented For Mission–Critical Applications".
L.E. Heindel et al., "Next Generation Project Management Systems, Part 2=Prototyping", Apr. 1994.
A. Benlogab et al., "Hierarchical System Design For Production Planning", Oct. 1993.
Y. Nakashima et al., "Integrated Expert System with Object–Oriented Database Management System", Jan. 1992.
IBM Technical Disclosure Bulletin, vol. 35, No. 3, "Transportation Metaphor Workflow Status Display," Aug. 1992.

*Primary Examiner*—Thomas G. Black
*Assistant Examiner*—Ruay Lian Ho
*Attorney, Agent, or Firm*—Marc A. Ehrlich

[57] ABSTRACT

The inventive concept comprises a system platform for a synergistic, role modular work process environment. A work process object (WPO) (1001) is created, residing in a data base, and stored in a memory of the process and project management computer system (1030). All data concerning the process and project management are reported to said work process object (WPO) (1001) and said work process object (WPO) (1001) is used as a common data base. According to the inventive concept, each view must be supported by a specific workplace, represented by digital data and enforcing the rules for the specific role. A work process information model supports the dynamic definition and use of a data base object representing a work process, boch in its process and project planning modes and its execution. According to the inventive concept, one object supports simultaneously all modes delimited by dynamically moving boundaries. Workplace implementation enforces over-all rules for each role in the inventive system.

11 Claims, 18 Drawing Sheets

| PROCESS SCHEMA SET |
|---|
| PROCESS SCHEMA NAME<br>HOUSE BUILDING PROCESS |
| ACTIVITY TYPE SET<br>    ACTIVITY TYPE NAME<br>        ACTIVITY ATTRIBUTES<br>            ACTIVITY ATTRIBUTE VALUES<br>UTI<br>   HAS INPUT CONNECTOR FROM<br>      PROJECT START<br>   HAS OUTPUT CONNECTOR TO<br>      SPLIT HOUSE<br>   USES DOCUMENT TYPE<br>      HDE<br><br>ROC<br>   HAS INPUT CONNECTOR FROM<br>      SPLIT HOUSE<br>   HAS OUTPUT CONNECTOR TO<br>      ROO<br>   USES DOCUMENT TYPE<br>      HOU<br><br>ROO<br>   HAS INPUT CONNECTOR FROM<br>      ROC<br>   HAS OUTPUT CONNECTOR TO<br>      SPLIT FLOOR<br>          •<br>          •<br>          •<br><br>CONTINUES AS PRECRIBED BY FIG.2 |

FIG.7A

SPLIT/JOIN TYPE SET
    SPLIT/JOIN TYPE NAME
        SPLIT/JOIN TYPE ATTRIBUTES
            SPLIT/JOIN TYPE ATTRIBUTE VALUES

SPLIT HOUSE
        IS SPLIT TYPE
            "ALL"
        IS BUNDLE SPLIT
            "YES"
        HAS INPUT CONNECTOR FROM
            UTI
        HAS OUTPUT CONNECTOR BUNDLE
            ROC

SPLIT FLOOR
        IS SPLIT TYPE
            "ALL"
        IS BUNDLE SPLIT
            "YES"
        HAS INPUT CONNECTOR FROM
            ROO
        HAS OUTPUT CONNECTOR BUNDLE
            CAR

SPLIT INSTALL
        IS SPLIT TYPE
            "ALL"
        IS BUNDLE SPLIT
            "NO"
        HAS INPUT CONNECTOR FROM
            CAR
        HAS OUTPUT CONNECTOR-SET
            SAN
            HEA

•
•
•

CONTINUES AS PRECRIBED BY FIG.2

FIG.7B

CONNECTOR TYPE SET
    CONNECTOR TYPE NAME
        CONNECTOR TYPE ATTRIBUTES
            CONNECTOR TYPE ATTRIBUTE VALUES

PROJECT START/UTI
        HAS CONDITION
            "NO"
        IS WORK AHEAD
            "NO"

UTI/SPLIT HOUSE
        HAS CONDITION
            "NO"
        IS WORK AHEAD
            "NO"

SPLIT HOUSE/ROC
        HAS CONDITION
            "NO"
        IS WORK AHEAD
            "NO"

ROC/ROO
        HAS CONDITION
            "NO"
        IS WORK AHEAD
            "YES"

•
            •
            •

CONTINUES AS PRECRIBED BY FIG.2

FIG.7C

| PROCESS INSTANCE SET |
|---|
| PROCESS INSTANCE NAME<br>HOUSE BUILDING PROCESS |
| ACTIVITY SET<br>    ACTIVITY NAME<br>        ACTIVITY ATTRIBUTES<br>            ACTIVITY ATTRIBUTE VALUES<br>UTI<br>   HAS INPUT CONNECTOR FROM<br>      PROJECT START<br>   HAS OUTPUT CONNECTOR TO<br>      SPLIT HOUSE<br>   USES DOCUMENT<br>      HDE<br>   DEFINITION STATUS<br>      "COMPLETED"<br>   HAS EXECUTION STATUS<br>      "EXECUTED"<br><br>ROC.1<br>   HAS INPUT CONNECTOR FROM<br>      SPLIT HOUSE<br>   HAS OUTPUT CONNECTOR TO<br>      ROO.1<br>   USES DOCUMENT<br>      HOU.1<br>   IS ASSOCIATED WITH ROLE<br>      "MASON TEAM (JOE)"<br>   DEFINITION STATUS<br>      "COMPLETED"<br>   HAS EXECUTION STATUS<br>      "STARTED IN TASK H1 ROC" |

FIG.8A

ROC.2
   HAS INPUT CONNECTOR FROM
      SPLIT HOUSE
   HAS OUTPUT CONNECTOR TO
      ROO.2
   USES DOCUMENT TYPE
      HOU.2
   IS ASSOCIATED WITH ROLE
      "MASON TEAM"
   DEFINITION STATUS
      "COMPLETED"
   HAS EXECUTION STATUS
      "NOT STARTED"

ROO.1
   HAS INPUT CONNECTOR FROM
      ROC.1
   HAS OUTPUT CONNECTOR TO
      SPLIT FLOOR 1
   IS ASSOCIATED WITH ROLE
      "ROOF CONSTRUCTION TEAM"
   DEFINITION STATUS
      "COMPLETED"
   HAS EXECUTION STATUS
      "NOT STARTED"

ROO.2
   HAS INPUT CONNECTOR FROM
      ROC.2
   HAS OUTPUT CONNECTOR TO
      SPLIT FLOOR 2
   IS ASSOCIATED WITH ROLE
      "ROOF CONSTRUCTION TEAM"
   DEFINITION STATUS
      "NOT STARTED"

•
•
•

CONTINUES AS PRESCRIBED BY FIG.3

FIG.8B

```
SPLIT/JOIN SET
    SPLIT/JOIN NAME
        SPLIT/JOIN ATTRIBUTES
            SPLIT/JOIN TYPE ATTRIBUTE VALUES

SPLIT HOUSE
        IS SPLIT TYPE
            "ALL"
        IS BUNDLE SPLIT
            "YES"
        HAS INPUT CONNECTOR FROM
            UTI
        HAS OUTPUT CONNECTOR BUNDLE
            ROC.1
            ROC.2

SPLIT FLOOR 1
        IS SPLIT TYPE
            "ALL"
        IS BUNDLE SPLIT
            "YES"
        HAS INPUT CONNECTOR FROM
            ROO.1
        HAS OUTPUT CONNECTOR TO
            CAR.1

SPLIT FLOOR 2
        IS SPLIT TYPE
            "ALL"
        IS BUNDLE SPLIT
            "YES"
        HAS INPUT CONNECTOR FROM
            ROO.2
        HAS OUTPUT CONNECTOR TO
            CAR.2
```

FIG.8C

SPLIT INSTALL.1.1
    IS SPLIT TYPE
        "ALL"
    IS BUNDLE SPLIT
        "NO"
    HAS INPUT CONNECTOR FROM
        CAR.1.1
    HAS OUTPUT CONNECTOR-SET
        SAN.1.1
        HEA.1.1

SPLIT INSTALL.1.2
    IS SPLIT TYPE
        "ALL"
    IS BUNDLE SPLIT
        "NO"
    HAS INPUT CONNECTOR FROM
        CAR.1.2
    HAS OUTPUT CONNECTOR-SET
        SAN.1.2
        HEA.1.2

•
•
•

CONTINUES AS PRECRIBED BY FIG.3

FIG.8D

```
CONNECTOR SET
    CONNECTOR NAME
        CONNECTOR ATTRIBUTES
            CONNECTOR ATTRIBUTE VALUES

PROJECT START/UTI
        HAS CONDITION
            "NO'
        IS WORK AHEAD
            "NO"

UTI/SPLIT HOUSE
        HAS CONDITION
            "NO'
        IS WORK AHEAD
            "NO"

SPLIT HOUSE/ROC.1
        HAS CONDITION
            "NO'
        IS WORK AHEAD
            "NO"

SPLIT HOUSE/ROC.2
        HAS CONDITION
            "NO'
        IS WORK AHEAD
            "NO"

ROC.1/ROO.1
        HAS CONDITION
            "NO'
        IS WORK AHEAD
            "YES"

ROC.2/ROO.2
        HAS CONDITION
            "NO'
        IS WORK AHEAD
            "YES"

•
                •
                •

CONTINUES AS PRESCRIBED BY FIG.3
```

FIG.8E

```
PROJECT SET
PROJECT NAME
    BUILD TWO HOUSES
        TASK SET
            TASK NAME
                ENCLOSED ACTIVITY SET
                    ACTIVITY NAMES
                TASK ATTRIBUTES
                    TASK ATTRIBUTE VALUES

UTI

H1 ROC
            ENCLOSED ACTIVITY SET
                ROC.1
            TASK ATTRIBUTES
            IS OVERLAPPING TO
                ROO.1
            SCHEDULED START
                xx.xx.xx
            SCHEDULED END
                yy.yy.yy
            ALLOCATION EFFORT
                30 PERSON DAYS
            ACTIVE ROLE
                MASON TEAM
            ALLOCATED TEAM
                "MASON TEAM 1"
            DEFINITION STATUS
                "COMPLETED"
            TASK STATUS
                "STARTED"
            WORK STATUS
                "50% COMPLETED"
```

FIG.9A

H1 ROO

H1 F1 CAR

H1 F1 (SAN & HEA)

H1 F1 (IMO & PAI)

H1 F2 CAR

H1 F2 (SAN & HEA)

H1 F2 (IMO & PAI)

H1 EMO

H2 ROC
   ENCLOSED ACTIVITY SET
      ROC.2
   TASK ATTRIBUTES
   IS OVERLAPPING TO
      ROO.2
   SCHEDULED START
      xx.xx.xx
   SCHEDULED END
      yy.yy.yy
   ALLOCATION EFFORT
      30 PERSON DAYS
   ACTIVE ROLE
      MASON TEAM
   ALLOCATED TEAM
      "MASON TEAM 2"
   DEFINITION STATUS
      "COMPLETED"
   TASK STATUS
      "ALLOCATED"
   WORK STATUS
      "NOT STARTED"

H2 ROO

H2 CAR

H2 (SAN & HEA)

FIG.9B

H2 (IMO & EMO)
    ENCLOSED ACTIVITY SET
        IMO.2.1
        IMO.2.2
        EMO.2
    TASK ATTRIBUTES
    IS OVERLAPPING TO
        PAI.2
    SCHEDULED START
        xx.xx.xx
    SCHEDULED END
        yy.yy.yy
    ALLOCATION EFFORT
        20 PERSON DAYS
    ACTIVE ROLE
        PAINTER TEAM
    ALLOCATED TEAM
        "UNALLOCATED"
    DEFINITION STATUS
        "INCOMPLETED"
    TASK STATUS
        "UNALLOCATED"
    WORK STATUS
        "NOT STARTED"

H2 PAI

H1 USE

H2 USE

FIG.9C

METHOD AND APPARATUS FOR A PROCESS AND PROJECT MANAGEMENT COMPUTER SYSTEM

TECHNICAL FIELD

The present invention generally relates to the technical field of computer based process and project management and to process and project management computer systems. More specifically, the present invention relates to a method and a system for providing process and project management on a common management computer system.

BACKGROUND ART

The process of designing, developing and manufacturing a new product and the process of changing or adapting an existing product presents many challenges to product managers and engineers to bring the product to market for the least cost and within schedule while maintaining or even increasing product quality. Many companies are realizing that the conventional product design process is not satisfactory to meet these needs. They require early involvement of manufacturing engineering, cost engineering, logistic planning, procurement, manufacturing, service and support with the design effort. Furthermore, they require planning and control of product data through design, release and manufacturing.

Project Management, as a modern management tool, has its origins in the early part of this century when Henry Gantt developed his visual aid for work control. The so-called Gantt-chart is a graphic representation of a project schedule that shows each task as a bar having a length proportional to the duration of the task.

The British patent specification 1 397 088, "Process for converting activity on the arrow type network to an activity on the node", application no. 54905/72, filed Nov. 28, 1972, describes a digital computer process for changing the external representation of an activity on the arrow type network to an internal representation of an activity on the node type precedence network in order to allow a computerized project management system that is capable of processing an activity on the node type precedence network to also process an activity on the arrow type network, an example of the former being disclosed in British patent specification 1 375 917 with application no. 54131/72.

In G. P. Fitzpatrick, T. R. Haynes and W. R. Sterrett: "Transportation-Metaphor Workflow Status Display", IBM Technical Disclosure Bulletin, Vol. 35, No. 3, August 1992, pages 4 to 10, is described that the change from paper batch processing to on-line workflow processing makes it very difficult to understand the status of work-in-process. Forms processing tools allow for transaction paths to be defined and one of several people to request a transaction from a common queue to process the next available transaction.

In D. J. Spoon: "Project Management Environment", IBM Technical Disclosure Bulletin, Vol. 32, No. a, February 1990, pages 250 to 254, a process management environment is described including an operating environment, data elements, and application functions and processes.

In R. T. Marshak: "IBM's FlowMark, Object-Oriented Workflow for Mission-Critical Applications", Workgroup Computing Report (USA), Vol. 17, No. 5, 1994, page 3 to 13, the object character of IBM FlowMark as a client/server product built on a true object model that is targeted for mission-critical production process application development and deployment is described.

In H. A. Inniss and J. H. Sheridan: "Workflow Management Based on an Object-Oriented Paradigm", IBM Technical Disclosure Bulletin, Vol. 37, No. 3, March 1994, page 185, other aspects of object-oriented modelling on customization and changes are described.

In F. Leymann and D. Roller: "Business Process Management with FlowMark", Digest of papers, Cat. No. 94CH3414-0, Spring COMPCON 94, 1994, pages 230 to 234, the state-of-the-art computer process management tool IBM FlowMark is described. The meta model of IBM FlowMark is presented as well as the implementation of IBM FlowMark. The possibilities of IBM FlowMark for modelling of business processes as well as their execution are discussed. The product IBM FlowMark is available for different computer platforms and documentation for IBM FlowMark is available in every IBM branch. Flowmark is a trademark of International Business Machines Corporation.

In the European Patent Application "Automated interface to project management tool", Publication number: 0 314 596, date of publication of application: May 3, 1989, a method for the automatic interfacing of a conceptual design tool provides for the early manufacturing involvement information needed to aid and improve the total design and manufacturing effort to produce a final product. The conceptual design tool is used to build and modify a product structure. Using the conceptual design tool, a user inputs manufacturing details by item in the product structure.

The U.S. Pat. No. 5,303,170, "System and method for process modelling and project planning", date of patent: Apr. 12, 1994, filed Apr. 3, 1992, describes a method for enabling the flexible handling of time, iteration and resource type as variables; e. g. project/process simulation tool defines an activity, defines alternative resources required to commence the activity, determine availability of the alternative resources, and varies a duration of the activity based on the availability of the alternative resources. According to another aspect, a modelling process is a computer, provided for including: supplying a modelling program having a plurality of predefined stages of execution which collectively define a transfer function of an activity within a network, defining a plurality of user supplied programming statements, each provided with a label indicative of at least one of the stages of execution, and causing the modelling program to execute the user supplied programming statements, each immediately followed by a stage of execution indicated by the associated label.

The term "process" in the present invention is used in close similarity to the processes as definable with the IBM FlowMark product. That means that a process can be represented as a network of activities in a directed graph where the sequencing of activities is modelled by directed control connectors, control splits, and joins.

The concept of "project" in general is concerned with placing activities on a time line, often defined by a calendar. Each activity is planned to have a time duration and has to be executed by a resource, e. g. a person or a member of a team of persons. Project management is concerned with the achievement of target dates while using available resources, staying within the sequencing constraints of activities. Thus, project management without cooperating with a process manager employs normally implied knowledge about the rules of sequencing activities. As an example, when planning and controlling the building of a house, it is known in which sequence various activities have to be executed, e. g. the basement comes before the roof.

OBJECTS OF THE INVENTION

It is an object of the invention to provide a method and an apparatus for a process and project management computer system.

It is another object of the invention that changes to either the project or the process should be dynamically reflected and considered in the counterpart process or project with only minimum computing and storage requirements for the computer system.

It is a further object of the invention to provide the maximum of information to a user of the process and project management computer system.

It is the main purpose of the concept of this disclosure to combine process and project management in a way that process management defines only what is to be done, and in which logical sequence, while project management only contributes the aspect of time needed for the execution of activities within a calendar timeline within the freedom for sequencing defined by the process. For the purpose used here, the process defines all activities to be done with the maximum logically permitted parallelism and without any arbitrary sequentialization, while project management applies the constraints of the available resources towards executing the project within the schedules requested for the project.

SUMMARY OF THE INVENTION

The objects of the invention are fulfilled by the characteristics stated in enclosed independent claims. Further arrangements and embodiments of the invention are disclosed in the according dependent claims.

Current demands for quality systems imply requirements for synergistic integration of dynamic process and project planning, management and execution of work processes and people performing these tasks in different roles. Each individual user role exercises a different view over the work process, where the different views comprise different, partly overlapping functions over a work process.

The inventive concept comprises a system platform for a synergistic, role modular work process environment. According to the inventive concept, each view must be supported by a specific workplace, enforcing the rules for the specific role. A work process information model supports the dynamic definition and use of a data base object representing a work process, both in its process and project planning modes and its execution. According to the inventive concept one object supports simultaneously all modes delimited by dynamically moving boundaries. Workplace implementation enforces over-all rules for each role in the inventive system.

The invention as described in independent claim 1 eliminates the limitations and disadvantages previously described for the prior art.

A work process object (WPO) residing in a data base represents a work process as an integrated concept for process and project management, both for the definition of executable objects and for their eventual execution or interpretation. The data base is conceptually one data base, but in reality there can also be multiple data bases which can be regarded as one data base. The process and project management comprises process and project schemas and process and project instances wherein the instances are derived by instantiating respective schemas. One process schema can be instantiated into multiple process instances as well as one project schema can be instantiated into multiple project instances. Each instance can be regarded as a specific embodiment of the respective schema. A project instance can be derived from a project schema as well as directly from a process schema.

It is an advantage that all data according to the integrated process and project management are reported to the work process object (WPO), since this allows a generation of a complete set of data according to the process and project management in that work process object (WPO). It is further advantageous, that this storage concept reduces storage volume within the computer system. Further it is advantageous that this storage concept reduces the administrative overhead for the exchange of information and data between project and process management computer systems and enhances overall performance of the management computer system. Furthermore, it is advantageous that the work process object (WPO) is used as a data base commonly by the process management and the project management, since this guarantees data integrity between those two management purposes.

In one embodiment of the invention, the work process object (WPO) has structure of stages of a directed graph and is evolved and built-up in several stages starting from a process schema. The process schema has the major properties of a workflow model for a process, as known from the IBM FlowMark product. Such a model has the properties of a directed graph which introduces the direction concept also to the work process object (WPO). All additional details of the work process object (WPO) result from consecutive mapping by views over the base process schema in the lowest stage of the work process object (WPO). Based upon one base process schema multiple instances could be mapped, but for the description of the inventive concept, one work process object (WPO) is used as mapping from one single process schema through to one executable project and process and their actual execution. Stages are built-up by mapping over existing stages. Such mappings are achieved in views that are realized by user dialogues, supporting the specification of all details needed to bring the work process object (WPO) into the target stage. The term "view" is employed in a relational data base sense, with the meaning that the specific view has access to selected information in the work process object (WPO), but not necessarily to all information. The views control the complete definition of a work process object (WPO), creating and editing the various stages.

A work process object (WPO) is a directed object, in the sense that each view must build up a stage of the object in a directed way. This directed way is represented e. g. in the IBM FlowMark product by a directed graph, usually showing a direction from left to right. In the present invention, for the reason of appropriate representation only, a direction from top to bottom is assumed and figured. Therefore, each view must build up a stage of the object from top to bottom. Mapping by the dialogues of a view over a work process object (WPO) stage always are performed from top to bottom. That means that a boundary moves over the predecessor stage identifying how far the mapping over the stage has already progressed.

Interpretation of the directed graph is assumed here as top to bottom. After a control split as known from the IBM FlowMark product, no definition of top and bottom can be given for activities in parallel threads. It is assumed that no hidden synchronization across activities in parallel threads exists. But extensions to the concept of this invention could also cover such cases, but would require explicit modelling of synchronization dependencies. All activities immediately before a join as known from the IBM FlowMark product are by definition up of the join. Process and block activities are considered as elementary, for the process point of view. That means, no up or down relation can be given between any activity inside a sub-process or block to any activity outside the sub-process or block other than to the activities preceding and succeeding the sub-process or block in its containing thread.

It is advantageous that one dynamically changing work process object (WPO) represents a work process at its various points of definition and execution, and that several well defined views support the mapping between the stages of the work process object (WPO). It is further advantageous, that these well defined views reduce storage volume within the computer system. Furthermore it is advantageous, that the successive realization of the views by user dialogues allows a dynamic realization of the views adapted to the actual needs and requirements of the process and project management.

In a further embodiment of the invention, the inventive method defines task envelopes over a defined process schema or process for mapping a project schema or project over the process schema or process. The concept of "project" as used in this invention exercises certain constraints over the process, and maps the process onto a time scale provided by a calendar. For this purpose the project firstly defines tasks over the process activities and enveloping sets of activities that are to be allocated to the same user-id or person. Tasks are defined over a process by identifying task envelopes. A task envelope can be defined over a process schema for a project schema and over a process for a project.

Composite tasks have to be refined into simple executable tasks before actual start of task execution. Simple tasks need to be allocated to a unique user-id or team-id. An executable simple task can be allocated to a person or a member of team of persons that can be performing work interchangeably. Only for the reason of simplicity, teams are not discussed within this disclosure. For the same reason, tasks are executed by persons only, not by processors.

Activities in a process represent elements of work to be executed by the resource associated with the activity. In the context of this invention it is assumed that activity types are defined in a process schema. In a process instance, instances for activity types have to be defined. Such activities have to be executed in the context of simple tasks, which again have to be executed in the context of the project. Details of activity definition are as assumed for activities in the IBM FlowMark product. Activity types may be refined into activity instances later in the process interpretation and the concept of expandable activities provides syntactic placeholders for pieces of a process graph to be inserted later.

Every elementary activity has a processor associated which can be a processor type for a processing unit, a distinct processing unit, or a user role, for a type of person to execute an activity, or a user-id for an identified person. The distinction between a process schema and a process instance following IBM FlowMark product concepts is located in bundles and in instances of activity types. A bundle represents in the schema a thread in a graph where conceptually one or more parallel instances of the thread could be defined in a process, and where the precise definition how many actual threads will have to be executed will be given for a process instance, in most cases dynamically during execution.

The semantics defined in a process as considered here should be the pure logic of the process: which activity could be executed under which condition, based on the process of execution of activities above in the graph, and based on data provided by theses activities for condition evaluation. In other terms, it is assumed here that the process as defined exhibits the maximum parallelism as logically permitted, and thus does not contain any arbitrary sequentialization of activities. Or in still other words, no consideration of resource constraints on processes, processing units, roles, and users, should be modelled into the process. Such considerations should only be modelled into the project. It will not be discussed here whether the graph can be inspected for exhibiting maximum parallelism by a set of rules.

A further embodiment of the invention, comprises domains of definition or processing state in a stage with movable domain boundaries.

It is advantageous that views providing rules under which domain boundaries can be moved are represented by user dialogues. This allows that the refinement, which is involved with the movement of boundaries downwards through the work process object, is a dynamic process continuing throughout the whole project execution. It is further advantageous that, due to the inventive data architecture concept, this is achieved with only minimum administrative efforts of the computer system.

In a further embodiment of the invention, bundles are represented by levels of data, and horizontal and vertical envelopes are used in order to define tasks. The term "pattern graph" is used as known from the IBM FlowMark terminology as a kind of a base graph. The terms "vertical" and "horizontal" envelopes are based on and reference to the actual top-to-bottom view of the directed graph; when establishing a left-to-right view of the directed graph, these terms change their places.

It is advantageous that this embodiment provides a data architecture within the computer system representing a complete picture of the tasks during process and project management.

In a further embodiment of the invention, task stacks represents task resulting from a expansion of a loop.

It is advantageous that the task stack is able to represent the vertical expansion from top to bottom for the execution of tasks created by expanding a loop, the loop is a variety of the block known from the IBM FlowMark product. This allows advantageously for each iteration of execution of the contents of the loop the creation of a separate task envelope and task, either from default loop dimensions or dynamically when loop iteration information becomes available. The tasks in a task stack follow normal scheduling rules and cannot be defined to overlap.

In a further embodiment of the invention, a definition of a degree of overlap is supported.

This is advantageous since tasks defined as overlapping can be defined with overlapping schedules. It is further advantageous, that when defining the envelopes over parallel threads of the process, for each task overlap the predecessor/successor relation is defined, which in this case is not implied by the process definition. For each pair of overlapping tasks it is to be defined for the successor task, which portion of the predecessor task must have been performed to enable the activation of that successor task. For two or more overlapping predecessor tasks the overlap condition must be fulfilled for each predecessor task separately. Overlap measures can be hours, days, months of elapsed time or effort spent, percentages, or other possible criteria.

In a further embodiment of the invention, an integrated view of process and project management is presented to a user of the computer system.

It is advantageous that a user of the computer system is able to get complete information of process and project management from only one computer system; this is achieved by using the work process object (WPO) as the common data base for process management and project management. It is further advantageous that this is achieved with only minimum computer system resource by avoiding duplicate information storage for process and project management. It is further advantageous, that a person involved in a project is presented a work execution workplace that in one of several views that the user can select, presents him with the set of activities assigned to him from the context of enabled activities in the process and from the activated task enveloping these activities. The user can advantageously select between a process view and a time view for the activities presented to him in this workplace.

The invention eliminates the limitations and disadvantages previously described for the prior art.

It is advantageous that all data according to the process and project management is reported to the work process object (WPO) since this provides a complete data base for the management. It is further advantageous that this is achieved with only minimum computer system resource by avoiding duplicate information storage for process and project management.

The invention provides the possibility of carrying a computer program on a computer system.

It is advantageous that the data carrier allows the execution of the computer program on several computer systems, e. g. on clients and servers, or even on different computer platforms, e. g. Personal Computers, Work Station Computers or Main Frame Computers. The data carrier can store the information in a digital or analog manner using mechanical, electrical, magnetical or optical effects.

Since the area of process and project management has not yet reached a state of stable terminology, some terms will be clarified in the following:

Work in the form of tasks is allocated to persons by a function of resource allocation. Such functions represent state of the art and are not further discussed here.

Work allocation identifies the person who will later execute the work. Work allocation does not yet imply that the work for tasks can actually be already performed by the allocated person. Work must be assigned to a person before the person can commence work.

Work is assigned to a person for actual execution when it has been previously allocated to that person and when the specific task which contains the work, as activities, has been activated for execution due to satisfying its previously defined scheduling conditions.

Work execution is the actual execution of the work activities as modelled in the process, enveloped in a task, allocated by the project for a task, and assigned to the execution resource. The execution resource, e. g. a person or a processor, is assigned at that point of the process and project interpretation when both the activity is enabled for execution due to the process logic and the task containing the activity in its envelope is activated. At that point work will be assigned to persons. Both, activity start and task start as well as activity end and task end generate status and other information to be recorded to the work process object (WPO).

The present invention discloses a work process object (WPO) recording all data from the process schema through the execution of the last task in a project. The work process object (WPO) has the conceptual basic structure of a directed graph, built from activity nodes, linked by control connectors, splits, and joins. Within this work process object (WPO) a number of sub-objects may be created that are related to individual attributes of activities in the graph. The architecture of these work process objects and some of the rules and procedures for their dynamic behaviour represent the inventive aspects in the present application.

The dialogues and functions in a view map one or more domains of the work process object onto another. Conceptually these domains can be seen as the set of activity types containing levels of attributes for the specific domain, plus the additional sub-objects related to the domain levels, e. g. for task sub-objects. It should be understood that the graph of the process schema contains the basic structure for all overlaying domains. In the case of bundles, a concept in the IBM FlowMark product, for some threads in that structure multiple instances are associated with the root for the thread. Each instance inherits some domain properties out of copying the root thread, and obtains other attributes the normal way through views and their associated dialogues. For blocks and for sub-blocks, in the sense of process activity of the IBM FlowMark product, some further complexity would have to be introduced to the work process object (WPO), without contributing further inventive aspects.

The dialogues of a view move the boundary of a domain, separating a completed partition of the stage above from an empty or only partially developed partition of the stage below. In general, the views and the dialogues follow this concept, moving the domain boundary from top to bottom. In exceptional cases a domain boundary may have to be reset upwards, for necessary rework, reediting or error correction in a previously completed partition. It will be an explicit decision by the person executing a view dialogue, where to place the domain boundary, declaring a partition completed. This will trigger consistency checks which confirm the boundary position or require further editing work. Below a boundary, new editing activities for the incomplete partition below the boundary can be performed even before the partition above the user declared boundary is fully consistency checked. For each domain a level of domain-specific attributes is built upon the base activity instance in the base layer of the process schema. With this layer also the location of the boundary between partitions is recorded.

The process schema view maps a process schema over an empty work process object. The view dialogues build up a process schema, that we can consider as a graph, composed of activity type nodes,
control connectors,
control splits, and
control joins.

Activity types can be of the classes
elementary activity,
process activity, and
block activity, following the similar concepts in the IBM FlowMark product. Block activities also appear in a variation serving for loops, which requires special treatment as defined later. Certain portions of a graph can also be designated as root for bundles, whose properties will also be discussed later. While it is assumed that a correct process schema is to be built from top to bottom, a not yet completed schema may also be augmented and altered during creation without applying a "top to bottom" rule. Only completely created partitions of a process schema have a process schema completion boundary below. It will be an explicit decision of the person editing the process schema, which partition of the schema he considers completed, thus triggering consistency checks and the positioning of the boundary.

Below this completion boundary new creation actions of the process schema view may start the building of further partitions, which are still outside the process schema boundary. Partitions are optional, and the whole schema could be edited at the same time, establishing the boundary below the schema. The approach, where the boundary for a view can be moved dynamically downwards for a partition, while other view functions already create object data below of that boundary for a further partition, will be applicable for all the views to follow.

A project schema view maps a project schema, that is some task envelopes and task definitions, over a process schema. We distinguish two types of tasks: composite tasks and simple tasks. Composite tasks must be refined into simple tasks before they can actually be executed. The boundary process instance/project instance gross delimits a process partition of the work process object from a partition containing composite tasks. The allocated task boundary separates a partition of the object containing only simple tasks from the one still containing composite tasks. These boundaries may already exist in a project schema but are relevant only in a project instance.

Composite tasks serve to develop plans for the future in a project where details can only be given at a later stage in process and project refinement. For this purpose also an extension to IBM FlowMark concepts must be employed—process activities that can be expanded at a later stage, that means are replaced by the graph contained in that procedure. Again the contents of such an expandable procedure may be specified later at the creation of an activity instance for the activity type. Composite tasks may be nested.

The project schema serves the purpose of defining default task structures over a process schema, which together with the process schema can be used for creating multiple instances for multiple projects. The rules for the project schema view are the same as for the project instance view and will be discussed there. The information from the project schema level will be copied into the project level when this is created in the respective view. The mechanism for providing a default project schema over a process schema represents one of the inventive concept in this disclosure.

A process instance view defines for one instance of execution the details of a process that need refinement over the used process schema. In particular, concrete activities have to be identified for activity types in the schema, and for bundles it has to be resolved how many instances of the bundle thread have to be planned and executed. For each thread in a bundle a virtual parallel thread will be established in the graph for the object. Note that bundles are always preceded by a bundle split and concluded by a bundle join. The process instance view functions move the Process Schema/Process Instance Boundary from top to bottom. As described above, this can be done in partitions.

For all elements of a process instance, i. e. activities and bundles, a process instance layer is put on top of the process schema layer for the elements in the work process object. Each such layer contains layer-specific attributes. When partitions are used, a corresponding sub-layer for the temporary partition is inserted, but later removed when the specification up to a boundary has been completed and verified. The way of expressing bundles is an inventive sub-concept for the overall inventive architecture of the work process object.

This view comprises two sub-views, that both contain major inventive concepts. An Allocated Task Boundary separates the partition of the work process object that contains only simple tasks that are already refined to the detail where they can be activated, from that part of the object where composite tasks still require resolution, refinement or allocation before reaching executability.

The TASK ENVELOPING VIEW identifies the task envelopes over a process schema or process, or composite task envelopes over projects.

The TASK PLANNING VIEW and its dialogues associates enveloped tasks with schedules and execution resources as well as some task attributes.

The TASK ENVELOPING VIEW overlays task envelopes over the graph of a process schema or process instance or project instance. A simple task provides a closed, non-crossing envelope around elementary and composite activities. Defining a simple task the following rules are involved:

- a simple task envelope may have one or more incoming control connectors, which all must originate from activities via navigation conditions above in the graph to the activities in the envelope. Incoming control connectors must connect directly to activities inside the envelope, without any intervening navigation conditions (transition, split, join)

- not all activities in a process need to be enclosed in tasks for a project. The project may also contain non-managed activities that are enabled and assigned to persons by process execution rules as e. g. in IBM FlowMark today.

- all navigation conditions in the connectors between two task envelopes are positioned outside these envelopes. Condition evaluation for navigation is automatic and not subject to scheduling by project management.

- simple tasks may only enclose activities that are all assigned to the same role or to the same person. For all composite activities (process activities, blocks) this must be guaranteed, but cannot necessarily be statically checked. In such cases dynamic task assignment controls must be involved that in case of violations raise an exception for a project planner.

- a special case is the enveloping of tasks that follow a split condition. A task into which one or more, but not all of a "select n of m outputs" split enter, must be defined as composite task. Only if all connectors enter the task, or the condition was a "select all outputs" condition, the envelope may be defined for a simple task. It should be noted that the so-called "false propagation" in IBM FlowMark takes care, that all control connectors from top to bottom will be assigned a TRUE or FALSE value and cannot remain in the state UNDEFINED.

- a special case is the enveloping of bundles. In this case a horizontal envelope for a not yet expanded bundle may comprise one or more activities in the root thread of the bundle, identifying that all instances of these activities for thread instances belong to the same simple task, or identifying vertical enveloping implying that each thread, or each portion of a thread if so enveloped, will expand into a separate task, to be separately assigned to execution resources.

- a special case are tasks of type "overlap". Such tasks can overlap in their execution. Two or more tasks may be defined as overlapping with one or more first tasks. The first and the overlapping task must be adjacent, that means all control connectors entering the overlapping task must come directly from one or more first tasks. Such overlap can be defined for two or more activities or sub-graphs that all follow the same split. Horizontal tasks over bundles can also overlap in scheduling. For horizontal tasks their sequencing rules will be defined separately with the task planning view described below.

for loop blocks two modes of enveloping are possible. Enveloping a loop block with a simple task implies the execution of all iterations of the loop within one task. Enveloping the loop block with a task stack implies a stack of consecutive simple tasks, each as a separate task for one level of task execution. The depth of the stack is either delivered as a default value already from a project schema, or provided at any time later in the project, in cases immediately before the next iteration starts. A task stack with undefined iteration factor is considered a composite task for the positioning of the executable task boundary, as described later.

in no case are task boundaries allowed to intersect each other. They may only touch in case of nesting levels. As a consequence, e.g. one activity cannot be enveloped by more than one simple task.

A composite task must contain one or more composite tasks or simple tasks and may contain one or more elementary and/or composite activities. Composite tasks must be defined so that at their resolution into simple tasks the rules for connectors for simple tasks are obeyed, i. e. that for the project instance view dialogue adequate messages will be created that guide the person editing the work process towards eliminating possible conflicts with the connector rules for simple tasks.

Composite activities (blocks and sub-processes) by definition have only one ingoing and one outgoing control connector. When they are contained in the envelope of a simple task, their contents must be executed by the rules for a simple task as given above. If they are directly contained in a composite task, their contained activities can be enveloped separately by simple tasks, contained in the enveloping composite task.

It has to be assumed that in many cases the most global composite tasks are defined before their more detailed contents become defined. Thus errors in the view dialogues can only be detected when by refinement these details become refined. For each composite task first an activity must be defined, as described earlier, that itself can later be expanded in the graph. (8) If such an activity is expanded, it disappears from the work process object and its corresponding graph, together with the composite task defined over it. If the activity is a process activity, the composite task defined over it remains in the object as composite task. Thus composite tasks may either be used as a transient placeholder for later refinement, or may represent a higher level task in a hierarchical task structure. Composite tasks may also be designated as overlapping tasks.

For each simple or composite task defined by drawing an envelope, a task name unique within the project has to be defined. This task name on the one hand is associated with a task association layer of all activities contained within a task, for the case of composite tasks with one level per task nesting level in a task hierarchy, either as transient level for an expandable task, or as permanent level for a task in a persistent hierarchy. Thus the base activity type element of the graph obtains one additional level in the project domain for each nesting level of tasks and each nesting level contains itself the information in which further level it is included. Since activity type elements of the graph cannot be shared by tasks in any other way than nesting, this mechanism works without ambiguity.

For each such identified task a separate object as sub-object of the work process object is created that contains various attributes assigned to tasks. These attributes are established in the task planning view.

A process defines the logic of what has to be done within a project. Project management introduces constraints over the logic so that given schedules can be reached within the constraints of available resources, while not violating the process logic. Project management in general involves movements of tasks and activities along some calendar lines, and managing resource assignment for the execution of the project plan. These optimizing activities are state of the art and shall not be further discussed here.

What is discussed here is the novel concept how the existence of the process definition can control the editing of the project plan, scheduling tasks and allocating resources in a way that the processing logic as defined by the process instance is not violated by project management actions. Tasks have been defined as representing those aggregations of activities over which schedule planning and resource allocation should be applied in a project. A number of sub-views is distinguished for the TASK PLANNING VIEW:

Task role or user view: When defining the envelope of a simple task, this envelope can only be drawn for activities either assigned to the same role or to the same person. A role will later be resolved to the person allocated or assigned to execute the task. This attribute is assigned to the specific sub-object for the task.

Task duration: When defining a project schema or project, each task can be assigned a duration. The corresponding values may be recorded with the planning life cycle attributes of its planning as e.g. DEFAULT, ESTIMATION, PLAN OF RECORD, PROJECTION.

Interactive task schedule definition: A task can be assigned a start and end date, or only one of these when a duration already exists for a task. Both start and end dates can be associated with the same planning life cycle attributes as duration. Whenever a task schedule start or end date is explicitly or implicitly established via duration, neither start nor end are permitted to violate the top to bottom rules as established by the corresponding task envelope. This means that a task may only be planned to start when the predecessor task or tasks all are planned to have ended. Since tasks are defined over the activities in a process, the dependency of tasks on the logic of activity execution is thus automatically enforced. Task start and end dates cannot be defined for tasks in a project schema. In cases where unmanaged activities are interspersed between tasks, these activities are ignored for purposes of schedule checking.

Batch task schedule definition: In cases it may be appropriate to assign schedule values to more than one task consecutively from top to bottom, without checking task sequencing consistency. In that case a message list of inconsistencies, analysing from top to bottom is generated. Parallel to the batch schedule assignment an assignment log is generated which can be used to reset all changes that follow the first detected inconsistency.

Task schedule definition for overlapping tasks: Tasks defined as overlapping can be defined with overlapping schedules. When defining the envelopes over parallel threads of the process, for each task overlap the predecessor/successor relation is defined, which in this case is not implied by the process definition. For each pair of overlapping tasks it is to be defined for the successor task, which portion of the predecessor task must have been performed to enable the activation of that successor task. Overlap measures can be hours, days, months of elapsed time or effort spent, percentages, or other possible criteria that are not relevant for this disclosure. For two or more overlapping first tasks, the overlap condition must be fulfilled for each first task separately.

Task schedule definition for task stacks: A task stack represents the vertical expansion from top to bottom for the execution of tasks created by expanding a loop which is a variety of the block from IBM FlowMark. For each iteration of execution of the contents of a loop in this case a separate task envelope and task is created, either from default loop dimensions or dynamically when loop iteration information becomes available. The tasks in a task stack follow normal scheduling rules and cannot be defined to overlap.

NULL tasks may be declared in cases where split navigation conditions select between several possible threads, eliminating the execution for non selected threads. The FALSE propagation by the workflow manager IBM FlowMark takes care to promote TRUE/FALSE values also through dead threads. Since a "select n of m outputs" split, as defined above, can only be followed by a composite task, it will be the decision of the planner who resolves the composite task, whether he resolves the task for execution, or declares the task and, where applicable, its successors to NULL, in which case it will be ignored for scheduling and resource allocation mechanisms. A more elaborate architecture may also automate the definition and propagation of NULL assignments automatically, if the workflow manager provides application program interfaces (APIs) for the interrogation of control connectors about their current state.

Tasks must be allocated to a person to become executable. Such allocation may be done by resource allocation methods which are state of the art in resource management.

The ALLOCATED TASK BOUNDARY delimits that partition of a complete project graph that only contains executable simple tasks that are already allocated, from the partition below the allocated task boundary that may contain composite or unallocated tasks. Unmanaged activities following simple tasks are contained within the allocated task boundary. NULL tasks are also contained within the boundary. This boundary must be one contiguous line that intersects all connectors of the graph such that the graph is completely partitioned into an upper section and a lower section.

When the execution of the work process reaches the allocated task boundary, an exception is raised that informs a planning person that the project is partially halted due to reaching inexecutable composite or not yet allocated tasks.

We are assuming that a work process is in principle managed, that means contains defined tasks, but may also contain unmanaged activities. The allocated task boundary, as defined above, dynamically defines which part of the project is planned to a level of detail that the work can be assigned for execution. We assume here the existence of a work execution manager that continuously interprets the work process object, identifies allocated process parts and analyzes the task definitions for their appropriate activation based on the state reached by predecessor tasks, as defined in the rules above.

This execution mechanism also monitors all exceptions, as analyzing that tasks could already be started due to predecessor completion, alerting planners on that situation, or detecting exception conditions where planned schedules have not been achieved. All these monitoring activities represent functions more or less existent in the state of the art of project management. The innovative concept is found in the integration of progress information from both process execution and project task execution into a common work execution view.

The WORK EXECUTION VIEW encompasses the combined benefits from the inventive concept for the persons involved in executing the work process, and represents itself an inventive concept. The persons in the project team are supported with a workplace that displays to them their work, and the work of the other team members they are cooperating with, in an integrated workplace, displaying the project planning views for the tasks assigned to the individual, and the process execution state within the tasks displayed. From the display of the tasks activated for him and the activities enabled for their execution he can select which piece of work he will select next.

The work process model contains all planning details for all domains of the work process, as well as all the actual data, dates and states of the tasks and activities involved in the work process. Thus the work process object also represents a comprehensive data base for all planning and execution information over the history of the project represented by that object that can by queried by normal data base query functions.

BRIEF DESCRIPTION OF THE DRAWINGS

FIGS. 7A to 7C show the process schema set of a work process object (WPO) for a house building process schema.

FIGS. 8A to 8E show the process instance set of a work process object (WPO) for a house building process instance.

FIGS. 9A to 9C show the project of a work process object (WPO) for a house building project.

DESCRIPTION OF A PREFERRED EMBODIMENT

One preferred embodiment of a method for process and project management according to the present invention will be described in the following with reference to the accompanying drawings.

Figure 1:
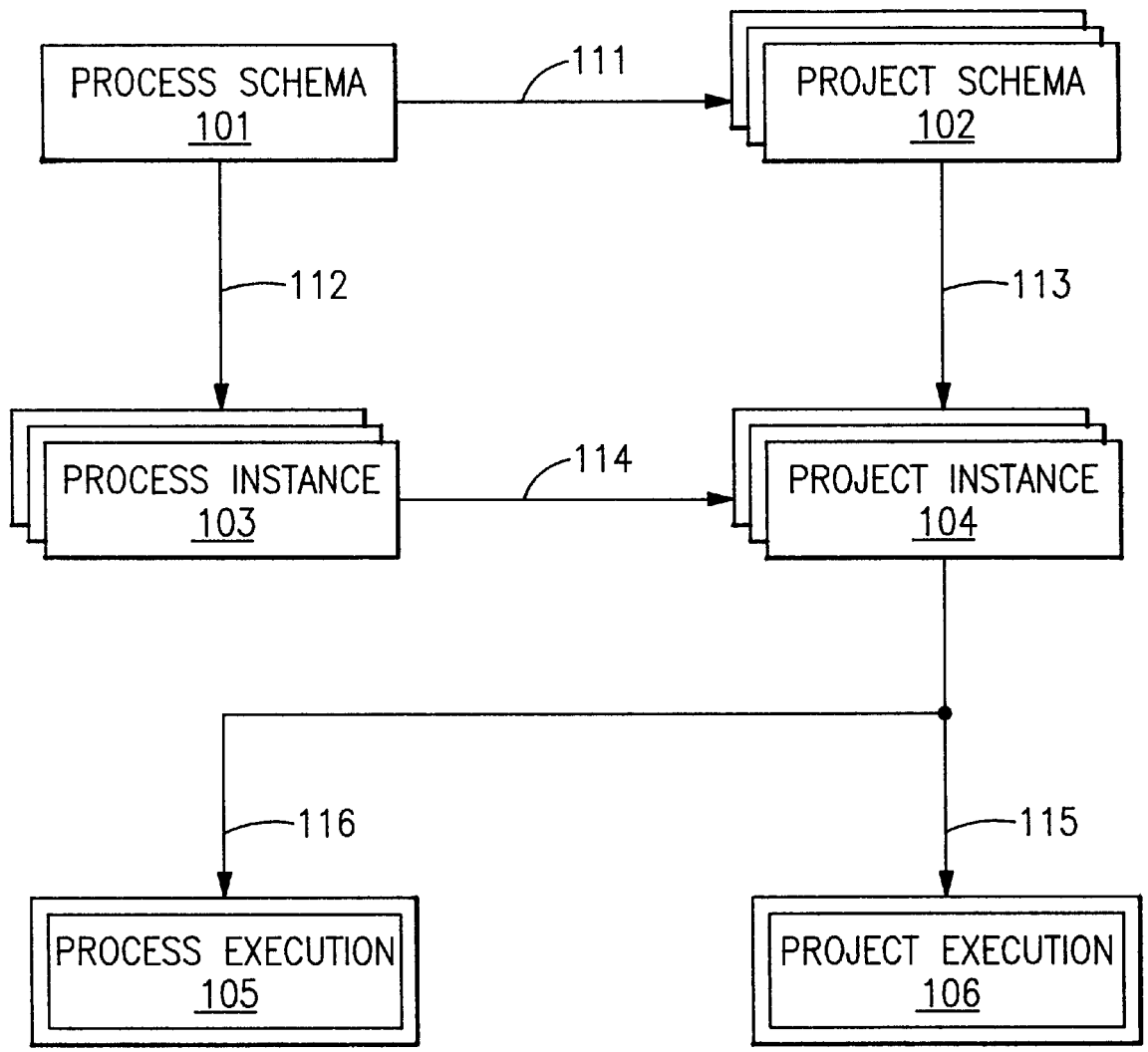
FIG. 1 shows a sequence of schemas and instances and shows how the work process object (WPO) evolves in stages.

The FIG. 1 shows a sequence of schemas and instances and shows how the work process object (WPO) evolves in the stages of:

process schema 101,
project schema 102,
process instance 103,
project instance 104,
project instance gross (containing composite tasks), project instance executable (containing simple tasks), process instance executed 105, and project instance executed 106.

From the process schema 101, project schemas 102 are derived 111 and process instances 103 are derived 112 as shown in FIG. 1 according to the used reference signs. Project instances 104 are derived 113 from the project schemas 102 and also are derived 114 from the process instances 103. The project instances 104 are the basis 116 for process execution 105 and are the basis for project execution 106.

Each stage is populated by a domain, which is created from top to bottom, and which is conceptually delimited by a domain boundary. Specific domain boundaries define the extent to which a specific work process view has been executed over the object, populating the partition of a stage within the domain with consistent and checked attributes. Executing the dialogues of a view moves the domain boundary in the normal case from top to bottom. Several of these views can operate concurrently on the same work process object (WPO). Normally, with some exceptions to be described, these boundaries must be in ordered positions from top to bottom, according to the respective mappings.

Domains evolve from top to bottom in the sequence of FIG. 1. For each domain, each activity type element of a work process graph contains a domain specific layer, which itself contains domain specific attributes. Thus, the layer of the activity type is the base layer on top of which layers for process schema 101, activity instance, process instance 103, project instance gross and executable, process execution, and project execution are placed. Sub-layers will be used in several cases for maintaining transient and movable boundary and task envelope information. With these layers in several cases sub-objects in the work process object (WPO) are associated.

The term "Work Process" is used in the following for the full integration of process and project management under the inventive concept. The example is taken from the context of a building enterprise in the building industry, where the building general contractor erects houses according to the requests of an owner. For brevity the sample will employ simplified processes and projects, but covering the essential aspects of the claims for the invention.

Out of the chosen industry the process of building houses and sets of houses will be described, where one well defined standard building process schema 101 for building houses is applied, and this process schema 101 can be customized for each instance of applying the building process towards building a concrete instance of a house, or multiple instances, according to customer requirements towards modifications of the standard house.

For the process of building the standard house, a project schema 102 is defined which manages the application of resources, as building teams and building equipment within well defined schedule and calendar constraints. The project schema 102 contains the assumed default data for one instance of building a house under normal conditions. For each instance of applying the building process for building a single house, or a set of houses in one large building project, instances of the project schema 102 are applied that reflect the customization requirements for each instance of building a house, under the constraints of the resources applied to the specific building project.

This whole set-up of process schema 101, process instances 103, project schemas 102, and project instances 104 are guided and controlled by the computer-based implementation of all these concepts. For each individual involved, that means each team member managed in the project, the adequate view for his work has to be implemented. These views comprise the planning, executing and monitoring of all processes and project plans for a concrete project, and for the building enterprise for all similar instances of such projects through workplaces dedicated to specific work by members of the project team.

The implementation of these concepts requires the realization of the work process object as the data base that contains all models for schemas, their instances, project schemas, and their instances with all plan and actual data and datas as they are planned and recorded throughout the execution of each instance of a project. As it will be shown, the optimal assignment of building resources for the building enterprise requires that these data are maintained across all projects in the enterprise because any resource management optimization can only be achieved for the total enterprise.

Around this data base the many distinct user views have to be supported and implemented to realize the individual workplaces for all members in the project teams, as well as for supervisory work within and across projects in the enterprise.

The basic concepts of process and project schemas and instances are described in the following:

First the concept of the Process schema 101 will be defined. This process schema 101 defines the essential activity types to be executed in instances of executing the process, and the document types for those documents that control steps in the process. Each activity type is related to a user role for the person or processor type ultimately required to execute the process in a project. The process schema 101 indicates that specific threads of the schema may be executed multiple times in parallel, indicating the starting activity and the ending activity of such a bundle. In the current example the bundle concept will be used to model the situation, where in a building complex a set of houses can be built in parallel, while several activities are in common for the whole complex. Each house again may have several floors that can be built in a way that for individual floors a thread of a bundle of activities can be executed in parallel once the rough-construction (ROC) has been erected for all floors and the roof been built above all floors to protect the house also during construction.

Figure 2:
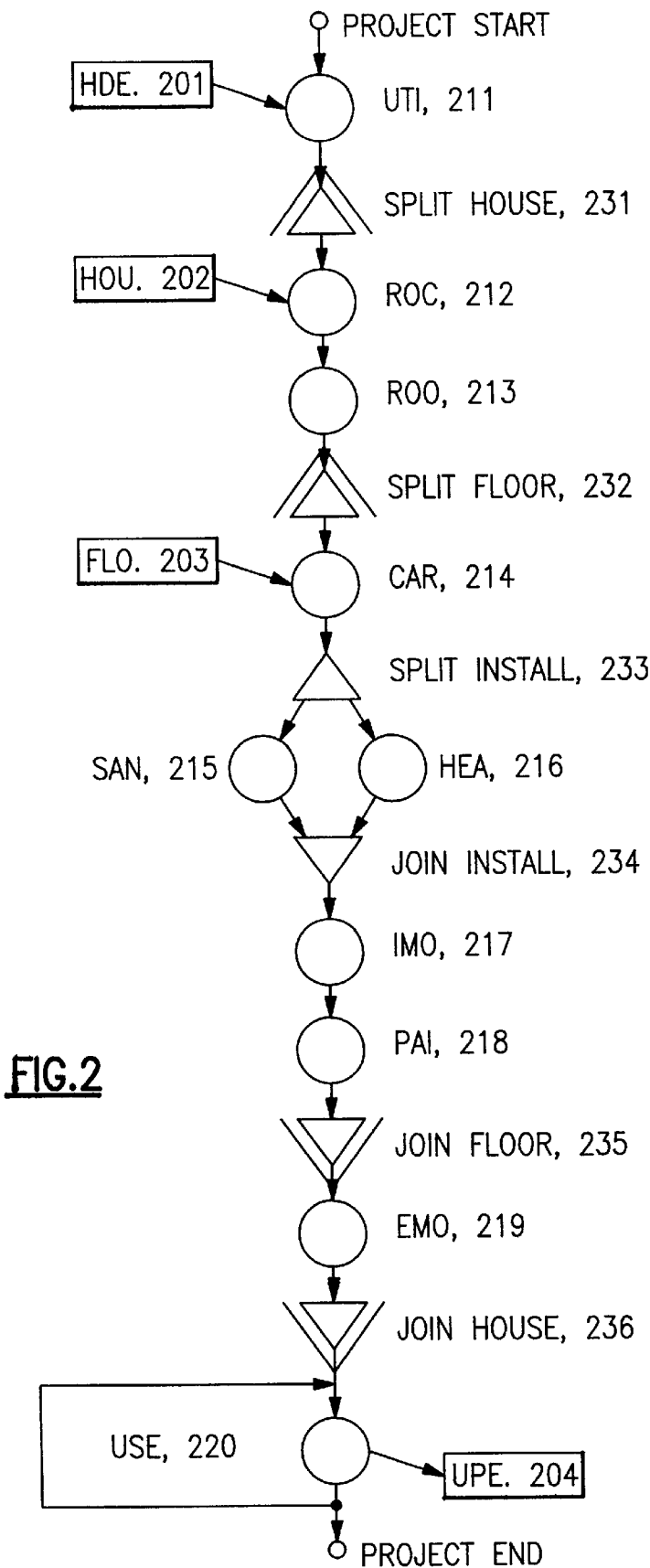
FIG. 2 shows a graphical representation of the building process schema, showing activity types and document types.

FIG. 2 shows a graphical representation of the building process schema 101, showing activity types and document types. The individual activity types, document types and user roles are given names that here are considered self-explanatory for an intuitive understanding of the semantics of these items in the process of building a house.

The abbreviations correspond to the self-explaining long names as follows:

| | |
|---|---|
| CAR 214 | carpenter's work |
| EMO 219 | applying external mortar |
| FLO 203 | blueprint floor |
| HDE 201 | blueprint housing development |
| HEA 216 | heating installation |
| HOU 202 | blueprint house |
| IMO 217 | applying internal mortar |
| PAI 218 | painting interior |
| ROC 212 | rough-construction |
| ROO 213 | roof-construction |
| SAN 215 | sanitary installation |
| UPE 204 | usage permit |
| USE 220 | usage permit inspection |
| UTI 211 | utilities and ground preparation |

The symbols used in FIG. 2 denote activity types and document types; the same symbols, but with instance names will be used later for process instances: HDE 201, HOU 202, FLO 203, and UPE 204 are representing "documents"; UTI 211, ROC 212, ROO 213, CAR 214, SAN 215, HEA 216, IMO 217, PAI 218, EMO 219, and USE 220 are representing "activity" types; SPLIT HOUSE 231 and SPLIT FLOOR 232 are representing "bundle splits"; JOIN FLOOR 235 and JOIN HOUSE 236 are representing "bundle joins"; SPLIT INSTALL 233 is representing a "split"; JOIN INSTALL 234 is representing a "join". For brevity the flow of building materials is not modelled, because it would not contribute to the understanding of the inventive concept.

Before a process schema 101 can be executed, first an instance of the schema, a process instance 103, has to be produced, conceptually by copying the schema. This copy may be customized by some modification to the standard process that does not significantly change the essence of that process. Such customization can reflect different customer options offered within the standard process. Again for brevity such customization will not be described any further because it does not contribute inventive ideas.

The instance of the process now must be filled with the concrete activities to be executed in this instance of the process. It has to be decided how many parallel threads of a bundle have to be executed in the specific instance, according to the number of houses to be built, and the number of floors in each house. Here the concrete activities could reflect the customization requirements, even if the process structure remains unchanged. Each of the defined activities must be assigned to defined roles, an assignment in general taken over from the project schema 102, but modifiable according to the specific instances for the given process instance 103. Also the references to document types must now be made concrete, referring to the documents of the specific building project.

Figure 3:
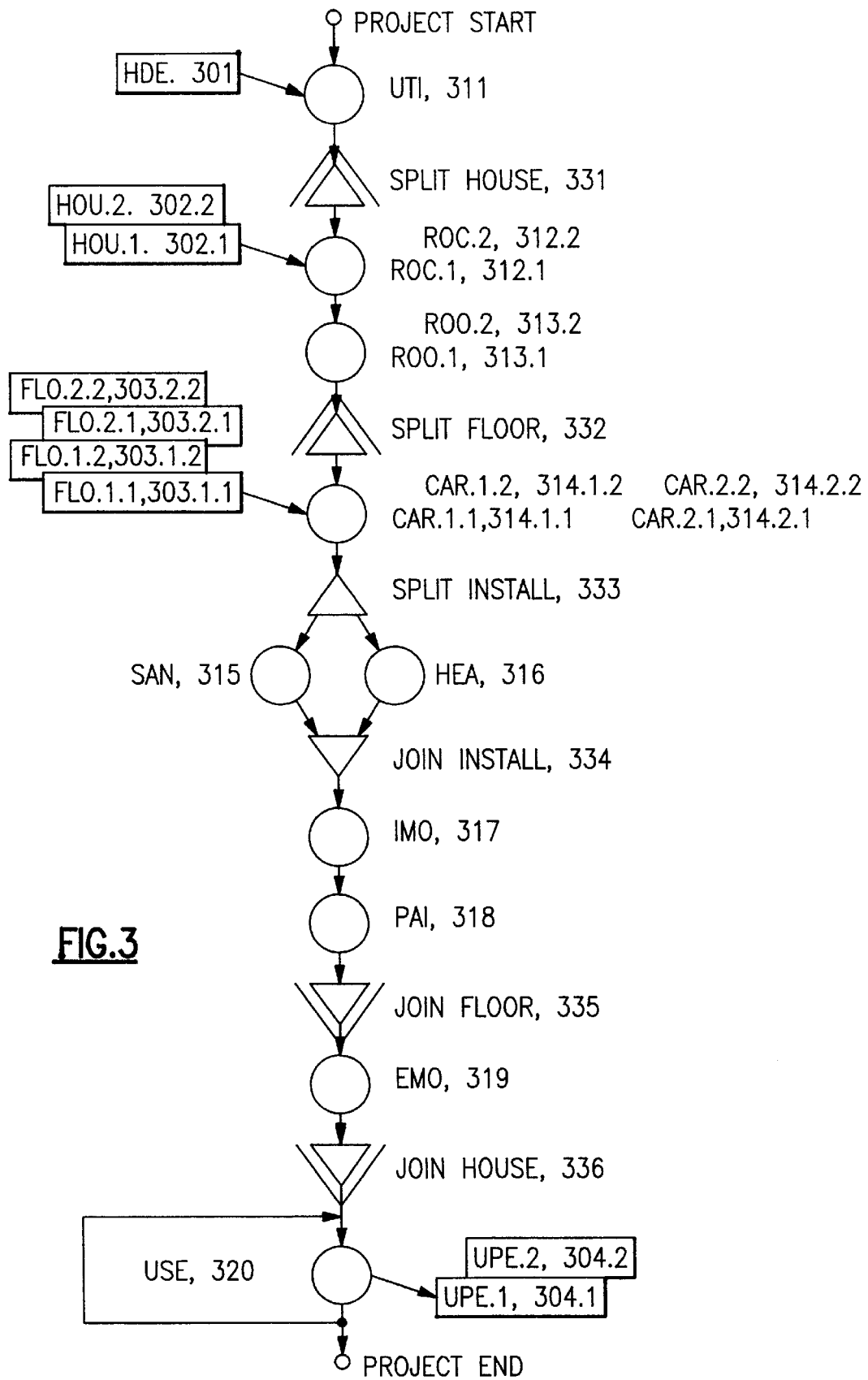
FIG. 3 shows a graphical appearance of the process instance mapping onto the schema in FIG. 2.

As the example assumed here does not change the process structure by customization, the graphical appearance of the process instance 103 shown in FIG. 3 maps directly onto the schema in FIG. 2, when viewed vertically.

The UTI activity 311 in FIG. 3 corresponds to the UTI activity type 211 in FIG. 2. The ROC.1 312.1 and ROC.2 312.2 activities in FIG. 3 correspond to the ROC activity type 212 in FIG. 2, wherein the notation "0.1" means "first house" and the notation "0.2" means "second house". Similarly the four CAR activities 314.1.1, 314.1.2, 314.2.1, and 314.2.2 in FIG. 3 corresponds to the CAR activity type 214 in FIG. 2, wherein the notation "0.1.1" means "first house, first floor", the notation "0.1.2" means "first house, second floor", the notation "0.2.1" means "second house, first floor", and the notation "0.2.2" means "second house, second floor". For the reason of brevity only, the activities and documents are fully qualified only to the SPLIT INSTALL item 333.

Figure 4:
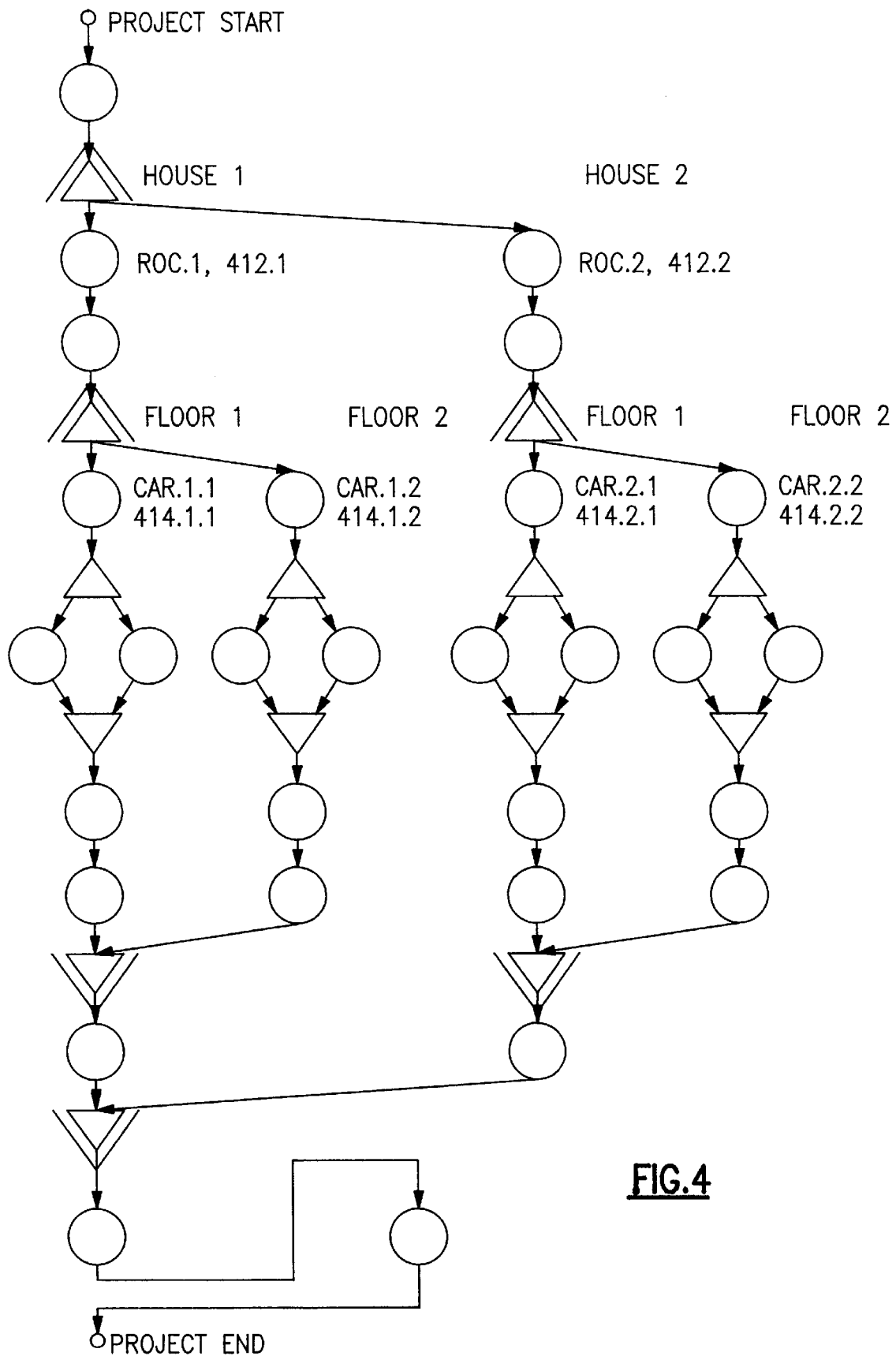
FIG. 4 shows the tilting of FIG. 3 into a three dimensional view with the multiple threads for bundles becoming visible.

When tilting FIG. 3 into a three dimensional view, the multiple threads for bundles become visible as shown in FIG. 4. In FIG. 2 the names of documents and activities are qualified with the number of the house and floor in house, two houses with two floors are assumed. Only in some spots all these qualified names are shown, e. g. ROC.1 412.1 is the activity "rough-construction" in house 1 and CAR.2.1 414.2.1 is the activity "carpenter's work" in house 2 on floor 1. In the tilted representation of the process instance 103 in FIG. 4 the names of activities and documents have been mostly omitted.

In a real project environment the process instance 103, in the following for brevity reason only referenced also as process 103, is to be executed in the context of real resources available for the project. It is convenient to have a default schema for such projects, a project schema 102, that is used as the common project plan skeleton from which the plans for actual projects can be derived 113. In the current example, the project instance 104, in the following for brevity reason only also referenced as project 104, will be directly derived 114 from the process 103. The project 104 identifies groupings of activities into tasks that are to be scheduled together and assigned to the same person or team of persons working on an assignable unit of work—a task.

In the following the term "resource" will be used to denote the unique personnel resource, either a person or a team assigned to the same task. As an example a team of masons works on a task without any further formal planning for each individual. Such teams are an established concept for resource management. In the current example the project 104 over the process 103 shows only one case of assigning two activities to the same team in the role installation, assigned both to sanitary and heating installation in one thread, as shown by the task H1 F1 SAN & HEA 5156.1.1, wherein the notation H1 F1 means "house 1, floor 1", or as shown by the task H2 SAN & HEA 5156.2 in the work for the second house, both in FIG. 5. In a similar way activities can be enclosed in rectangles, where the rectangle represents a named task and encloses those activities aggregated into that task.

Figure 5:
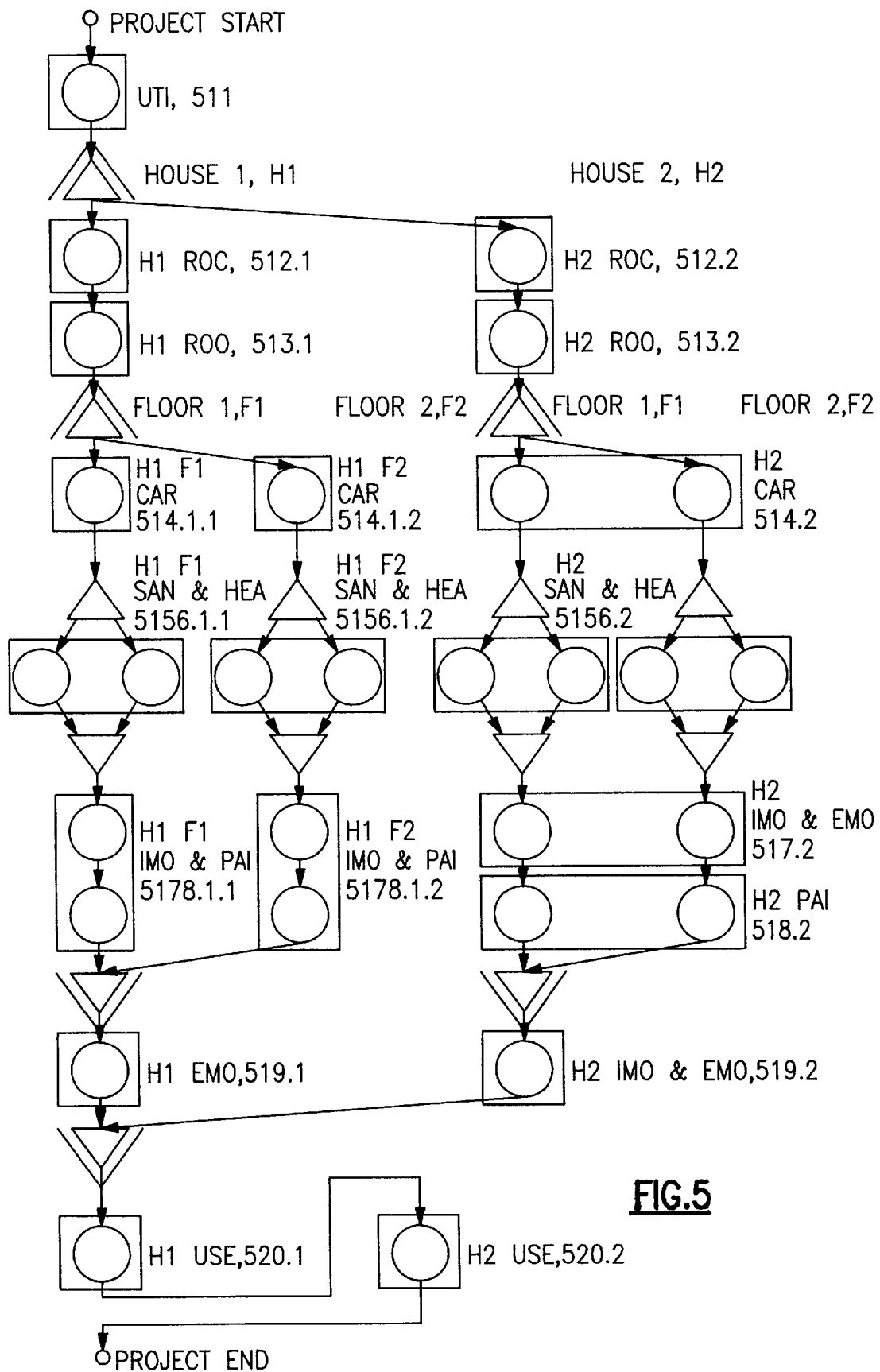
FIG. 5 shows task envelopes according to FIGS. 2, 3, and 4.

As shown in FIG. 5 more complex situations exist for bundles of activities even in this simple example. Task envelopes are visible in FIG. 5, e. g. H1 F1 IMO & PAI 5178.1.1 for applying internal mortar and painting interior of house 1, floor 1, or H2 IMO & EMO 517.2 for applying internal mortar and external mortar of house 2, floor 1 and 2. The project schema 102 contains the defaults for executing the process schema 101, so in the general case may not yet know the number of houses to be built and the number of floors in each house. This expansion becomes known with the definition of the process instance 103 for a specific project. The expansion of bundles into multiple threads takes place in the process instance 103 definition. As shown later, the expansion of threads and the assignment of tasks to this expansion offers a number of different options. Of course in a real project several of the building activities are broken down into smaller subactivities, subject to task assignments. But again, more detail would not contribute to the basic concept of the invention.

A project schema 102 is mapped over a process schema 101, by defining closed boundaries, graphically represented by rectangles in the example, over the process schema 101 containing the activities aggregated into one task. The same boundary concept is also involved for the mapping of a project instance 104 over a process instance 103.

For the actual project the actual resources available in the project have to be allocated to the various roles for performing the activities, managing the allocation according to their availability and full utilization. This may be provided by an instantiation of the project schema 102 resulting in a project instance 104 or by mapping from a process instance 103 to a project instance 104. It is here assumed, that the chosen process, populated for the instance of execution, is not modified during the progress of the project. It will be indicated later how a dynamic refinement of the process during the project execution could be achieved.

Throughout the project the project plan, that means the project graph with all its related data will be changed dynamically. The rules for such changes will be discussed after introducing the realization of the required data base for the details discussed so far. Additional details, expanding data base structures will be discussed later. All information in an enterprise about the involved process schemas 101, process instances 103, project schemas 102 and project instances 104, that means the total operational information, can be conceptually viewed as one single Work process object (WPO) that contains all information, in this example about all building projects of the building enterprise, about the project history, the current status and the future plans.

Such a work process object (WPO) in fact represents the total operational data base of the building enterprise, including all history information. For practical purposes some of this information ages and after some time becomes irrelevant. In practical circumstances some of this information has to be deleted occasionally to avoid data base overflow. But because these considerations are not essential for the inventive concept, only the information maintained in the data base will be discussed, but not the point in time when such information is deleted from the data base, that means disappears from the work process object (WPO).

As already shown in the FIGS. 2, 3, and 4 the basic concept of a process schema 101, process instance 103, and overlayed projects can be viewed as directed graphs. The direction indicates the sequence of execution of activities when interpreting the graph. The direction of execution points from an executed to a non-executed activity. These pointers can also point backwards in the sense that an activity already executed could be pointed to for a re-execution or resumption of execution. Thus in fact the graph may contain loops. The example in FIG. 3 shows a loop USE 320 for the acceptance inspection for the two houses, performed by the same commission in sequence as also shown in FIG. 4.

Implementing such a graph in a relational data base for example would result in item types "activity" and "directed connector" which form relations, and in addition can hold a variety of attributes. For each item type distinct item instances will be maintained in the data base, associated to the actual values of the associated attributes.

FIGS. 7 and 8 show an example of the work process object (WPO) contents for the FIGS. 2, 3, and 4, showing the work process objects for using the process in the case of building two houses with two floors. The boundaries for tasks in this work process object (WPO) model are also expressed as specific attributes of activities that identify the task under which a specific activity is to be executed, as is shown later in FIG. 5 for a subsection of the process from FIG. 3.

The work process object (WPO) data base contains information about the progress of execution in a project, but has to be augmented by sets of rules that control, in which way the work process object (WPO) is built up and in which way it can be modified. These rules control the various actions that users can perform in planning and executing projects and can best be described with the various views implemented to support the various user functions.

These views and user functions always define, plan, and control the progress of work, but mostly do not affect the actual manual work by people or machines in the currently discussed concepts. Or in other terms, the process and project management system here discussed does not control how a bricklayer lays the bricks, or uses a bricklaying machine, but rather when according to the overall project plan he has to lay how many bricks in how many hours. Of course his work is guided by control documents, the building plan as visible in the task chart shown in FIG. 6, but it is his responsibility to perform his work according to his professional skills, interpreting the building plan as visible in the task chart shown in FIG. 6. The process will contain elements of checking that work is executed according to plans, in this example summarized in the final usage permits UPEs 304.1 and 304.2 for the completed houses. In a real project of course many more checks will be imbedded in the process in order to detect deviations from the building plan as visible in the task chart shown in FIG. 6 early enough to avoid accumulation of later error correction through re-work.

It is an essential aspect to realize from this example that the concepts of process and project management are only reasonable to a certain level of granularity in a project, but not down to the lowest level of laying single bricks. The depth of granularity depends on practical considerations, weighing the overhead of planning and control against the benefits of fine granularity of control. The very same considerations apply to all similar business areas employing the same approach, from the current example of the building industry, through utilities, government agencies, shipbuilding, to software development.

The USER VIEWS FOR DEVELOPING PROCESSES AND PROJECTS are described as follows:

Various concepts introduced above, and refinements following in the later part of this example, involve the work of persons in various specialized roles, in first developing the general concept for the schema for the building process, a default schema for building projects, through all details of executing these in instances in actual projects. Each role is associated with sets of dialogues which can create and modify the view-related parts of the overall work process object (WPO), and involve various rules that both guide and constrain the actions a user can perform in-a specific role.

For most of these rules only the completed object has to conform to the rules, while during specification some rules may not yet have to be enforced. For each object a completed state is defined, where all rules are enforced. Objects during editing can revert back to a under development status. In dynamic development of an view a completion boundary will define an upper partition that is in the complete state, from a lower partition still in development. Roles will be given role names that semantically indicate the specific function of such a role. The concept of roles and role names is used here in the same sense as in the IBM FlowMark product.

The PROCESS SCHEMA DESIGN VIEW serves the purpose to design and edit schemas like the specific building process schema 101 shown in FIG. 2. In a window associated with this view the user in this role can place activity types, control connectors, splits and joins in a way that they form a directed graph, where the relations between predecessor and successor activities are always well defined. In addition the user can associate various attributes with activities and connectors. FIGS. 7 and 8 show sets of permitted attributes for which the view user can specify values.

Connectors in the graph can split and join in specific nodes, as shown for example on FIG. 2. The split/join concept does not contribute in a major way to the inventive concept and thus is not used extensively in the current example. One relevant aspect with splits is the characteristic, whether the exits from a split are mutually exclusive, previously described as "Select 1 of m Outputs" (expressed by a "1" symbol in the split symbol), permit more than one alternative selected from a split, (expressed by a "#" symbol), or indicate that all exits from the split will be executed once the process is executed, "Select ALL Outputs", (represented by an "A" symbol). The same concepts apply for joins. These split/join concepts become relevant when defining the tasks to be associated with the activities following a split.

A novel concept introduced here is the means to overlap the execution of activities, by connecting activities by two parallel control connectors: the "work-ahead" type of connector, permitting the start of the successor activity before the predecessor activity has terminated, and the normal control connector. The work-ahead connector can only be used in addition to the normal control connector and is represented as a work ahead attribute for the connector in the work process object (WPO). Connectors of type work-ahead could be represented by a special symbol in the graph representation. In the accompanying figures such a distinction was not made to avoid too much detail.

The activity started by an overlap connector can only terminate if the normal connector has sent the signal, that the predecessor activity has terminated. Or in other terms, the predecessor activity must be designed to send two signals into the graph, one for work-ahead and one for regular sequencing. The work-ahead concept will also be relevant for task scheduling. The graph of FIG. 2 is represented in the work process object (WPO) by activity type items that are related by control connectors, splits and joins, as expressed in the tables of FIG. 7.

Several rules apply when creating and editing the graph of a process schema 101:

NOT COPIED RULE requires that the process schema 101 object can only be modified as long as the schema has not yet been instantiated towards a concrete execution, that means as long as no copy of the schema has been made yet in the work process object (WPO).

SPLIT/JOIN CONSISTENCY RULE requires that the corresponding splits and joins in a graph have the same or not logically conflicting characteristics "1", "#", or "A".

CONNECTIVITY RULE requires that all activities must be connected by at least one incoming and one outgoing control connector, with the exception of those activities denoted as "start" or "end" activities of the graph.

The PROCESS INSTANCE DESIGN VIEW is based on the existence of a process schema 101 in complete state. Over this schema all detail names and attributes can be defined which make the original schema executable. This comprises the actual activities, connectors, and objects referenced in attributes of these, and specific attribute values. This view performs the population of the schema with concrete data, names and values. The dialogue first copies the schema from FIG. 2 into an instance in the work process object (WPO), as shown in FIG. 8, uses the same graph representation, now pointing to the copy made for the instance, and populates that instance.

In particular it must be defined for bundles how many instances of parallel threads are to be executed. For this definition the copy of the schema is extended into a three-dimensional graph, as shown in FIG. 3, and the attributes and values as shown in FIG. 8 for the contents of the work process object (WPO). Clicking on an activity or control connector opens the sub-dialogue for this view, supporting the entry of data, attributes and values, and about the number of parallel threads in bundles, which are automatically created from the two dimensional representation according to FIG. 3.

In the Project schema VIEW a number of those project data can be defined, which are then used in the project (instance). For brevity of this example the project (instance) view will be described, not going into details of the project schema definition. Project schemas are defined over process schemas and are represented by separate work process object (WPO) sub-objects.

The PROJECT TASK DEFINITION VIEW: A project view is defined over a process instance 103 in status "completed". FIG. 5 shows how a set of tasks can be defined over a process view, by enveloping one or more activities with a task boundary and establishing separate task objects as shown in FIG. 9 in the work process object (WPO). For example, a task H1 ROC 512.1 is defined by enveloping the activity ROC, wherein the notation H1 ROC means the rough-construction of the first house. Similarly, a task set H2 SAN & HEA 5156.2 is defined by enveloping the activities SAN and HEA for the second house. The tasks are also shown in the task chart of FIG. 6, as H1 ROC 612.1 and H2 SAN & HEA 6156.2 in this example.

In the following only a few aspects of the full assignment of tasks to all activities will be discussed. A set of rules applies when defining tasks over a process instance 103:

CLOSED ENVELOPE requires that all task envelopes must be closed lines, in the example drawn as rectangles.

NON INTERSECTING requires that task envelopes are not allowed to intersect, or cross each other.

Figure 6:
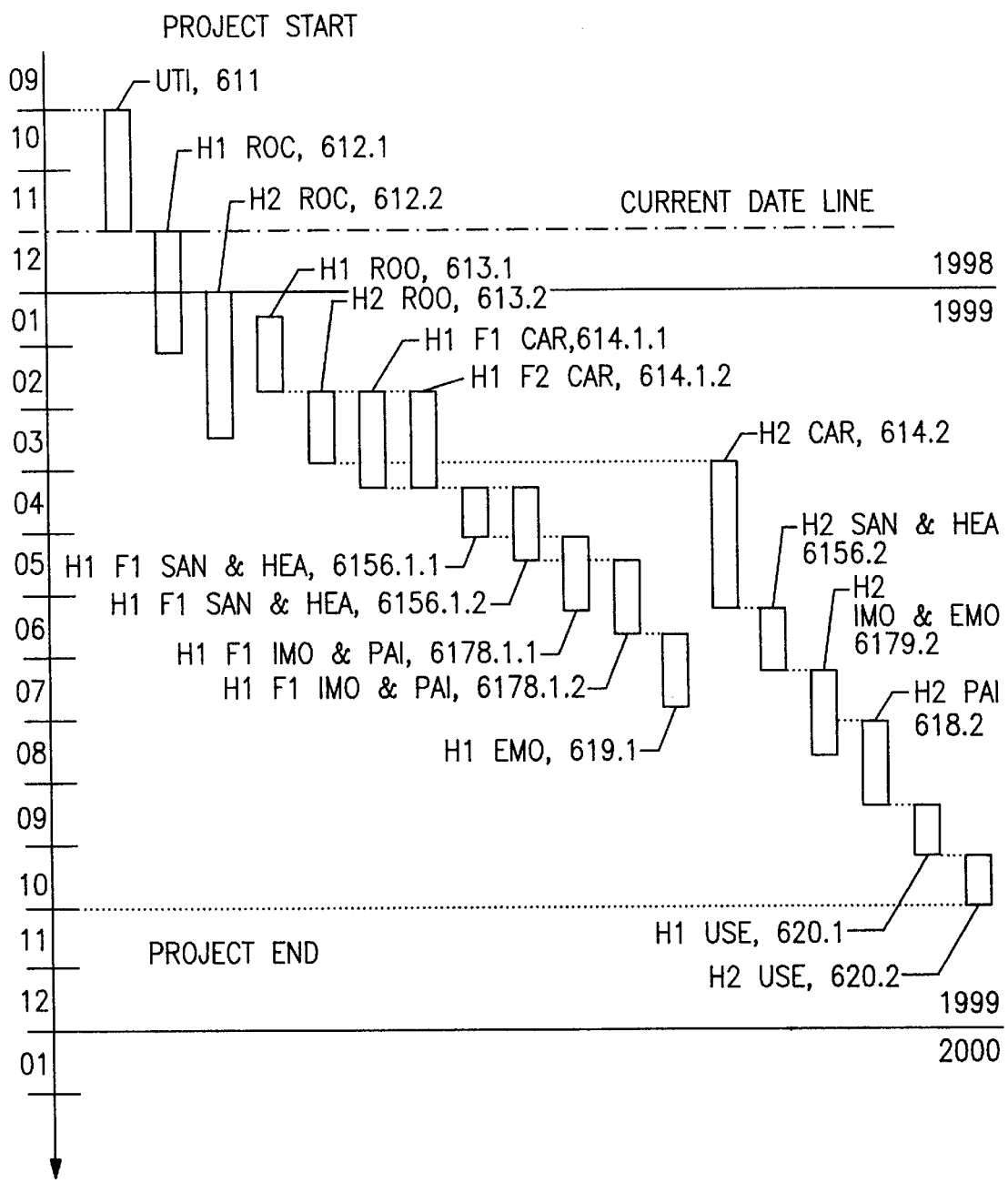
FIG. 6 shows a task chart according to FIGS. 2, 3, 4, and 5.

DISJOINT TASKS can be defined so that two or more complete envelopes belong to one task; in the example the two envelopes H2 IMO & EMO 517.2 and H2 IMO & EMO 519.2 as shown in FIG. 6.

NESTING permits that tasks can be nested within composite tasks, composed of elementary tasks. But this feature is not shown in the example because this nesting does not contribute to the inventive concept, but requires specific additional rules. More will be said under dynamic views below.

UNIQUE RESOURCE requires that a task is assigned to one single resource, either a person in a specific role, or a team of persons all acting in the same role. The encapsulation of activities into a task must obey this rule by enforcing that only activities associated with the same role are encapsulated. The assignment to physical persons can be performed here or later in the task assignment view shown in the work process object in FIG. 9.

TASK PRAGMATISM requires that tasks are not defined indiscriminately, but according to meaningful granularity of work control. The units of work should require an amount of effort worth managing for the enterprise. As said earlier, not the laying of single bricks should be managed but rather units of work measured in person-hours, person-days, or person-weeks, indicated in effort attribute for tasks in work process object (WPO).

In the project task definition view the individual tasks have been established as units of work to be managed, associated with the role executing the task, with a projected effort and a projected elapsed time for performing the task under defined resource assumptions. In the PROJECT TASK SCHEDULING VIEW these tasks will be assigned to the persons acting in roles, according to their availability, and to the schedules required for the project, building the houses until the final completion event. The actions of resource management and scheduling are state of the art in today project management tools. FIG. 6 indicates the dialogue type usual for this view. Bars represent the various tasks and the project planner can re-arrange these tasks and assign the right number of people to achieve the best result according to the targets of the project. But specific constraints over these functions have to be introduced which reflect inventive concepts:

PROJECT CONSISTENCY WITH PROCESS requires that tasks can be re-arranged in their sequence only to the extent that the sequence of activities contained within the tasks is not violated when tasks are arranged on a time scale. Or in other words: the logical activity sequence defined in the process must not be violated by the task sequence executing these activities.

TASK OVERLAPPING is permitted if two tasks contain activities that can overlap in time because they are in two parallel branches of the process graph.

TASK WORK-AHEAD defines situations where two tasks are in a predecessor/successor relation with activities connected with a work-ahead connector. Here tasks can overlap in the schedule plan, because both tasks can be simultaneously active, the same as the contained activities. In the example this is the case for tasks H1.ROC, and H1.ROO, as permitted by the work-ahead connector attribute and exploited by the corresponding task definition.

The USER VIEWS for EXECUTING ACTIVITIES IN PROJECTS: The views defined until now cover the development of processes and projects in their schemas and instances. Once a project is defined and started, various execution views come into play. These views instruct the persons assigned to the specific roles of work execution what they have to do and when. Such views represent the integration of process and project management aspects. The user is instructed what he can do logically by the various activities to be performed in one task, and the task information tells him when to do these activities.

Some of these views may under some circumstances give direct access to tools that can perform the work, and in many cases these actions can be performed directly on a workplace window. This is the case in the current example for all planning and monitoring activities where the result is directly entered into the work process object (WPO). But many of the activities in the current example relate to manual work. The instruction about tasks and activities and all their execution attributes will be handed to the executing persons in the form of a work order, for example in a printed form. The person receiving a work order must return the information to the system on the acceptance of the work order, as to instruct the project management function about the start of the execution of the task, and has to report back to the system work progress and work termination, included some measurement parameters like total effort spent on a specific task, or reasons for deviation.

In the real world there can be many actual realizations of these concepts, from one master plan nailed to the wall for everybody, to an online remote access to the work plans via telecommunication. The communication media is irrelevant as long as the communication flow is achieved at the level considered meaningful by the specific building enterprise. In practical environments often groups of people are involved in one role, where a selected individual acts as communication interface to the group, via documents or online communication means. Some user views are assumed for the current example:

WORK BAR CHART as realized as a read-only variation of the view shown in FIG. 6 shows the global view, or a customized subset view, for a set of teams cooperating on a building project. Task assignments are displayed as a bar diagram on a calendar basis, where each group sees their work assignment as bar whose length represents the duration of work, and where the diagram also permits the view over the work of other groups related to a specific group, and how tasks may overlap.

ACTIVITY ORDER LIST displays for an individual, or a team leader, the list of activities to be performed in the sequence of their required execution, and with sufficient detail on resources, schedules, and required completion information.

DYNAMIC PROGRESSING OF VIEW DEFINITION COMPLETION AND EXECUTION: In the discussions above it was only required, that the process schema 101 must be completed before an instance can be copied. For all other views mapped one on another, the rules for the mapping were open and will be given here. Some of the views introduced above are defined one over the other. In actual projects the definition of these views may progress while parts of a base view are still under specification. Also individual views can already start executing in their front part—the front part early in the sense of the directed graph—while definition and specification still continues in the later partitions. A set of rules is given to handle this situation for the example:

COMPLETION BOUNDARY is a boundary of definition for process instance 103 and project instance 104 views, where above the completion boundary the definition is complete according to the rules given above, while the part below the boundary, assuming that the graph direction is top to bottom, may still be in a state of definition, that is incomplete. The completion status is indicated in the work process object (WPO) activity objects and could be graphically displayed, e. g. in colour, which is not convenient to present in the current black/white figures.

LOOP COMPLETENESS requires that a completeness boundary may never cut a loop into parts above and below the completion boundary.

PROJECT DEFINITION BOUNDARY can never overtake the definition boundary of the process instance 103 on which the project is defined. That means the project definition boundary must always stay above of the completion boundary of the process instance 103 over which it is being defined. A project allocation boundary defines the partition where all composite tasks have been resolved to elementary tasks, and execution resources have been allocated to the tasks.

Another set of rules is associated with an execution boundary of a project. Whenever a project is in the state of executing, a boundary defines which tasks have been started and may be executing.

PROJECT PROGRESS can never proceed beyond the project allocation boundary. That boundary itself can never proceed beyond the process instance 103 definition completion boundary. This means that the persons planning the process instance 103 and the project must see to it, that planning must be progressing at a pace that actual work execution is not hindered by incomplete planning. Incomplete planning would lead to unassigned resources and an idle workforce in the project.

These dynamic boundaries complicate the implementation of these views to some extent, but are a requirement of reality in projects of sufficient size and duration where static definitions and resource allocation at project start are not achievable and not realistic. The various boundaries above are achieved by status attributes identifying the status above and below of the boundaries for activity and task objects in the work process object (WPO). From this information for each dialogue representing a view, the relevant actual boundaries can be found and represented in the directed graph.

TASKS OVER BUNDLES represent a special situation that is discussed separately. In the example this situation occurs in the process instance 103 of FIG. 3, where for building each floor a parallel thread of activities in a bundle is performed that is the same for each floor, but may be planned for execution separately in the tasks for the work in each floor. This situation is outlined in FIG. 5 that represents a complete set of task boundaries over the activities in the example.

In a top to bottom view, within one bundle two distinct situations can occur:

HORIZONTAL ENVELOPING, where all corresponding activities from individual threads are aggregated into one task. Such would be the case when some professionals, say the sanitary installation team is not planned to complete one floor after the other, but for some planning purpose should complete this work within one task across all floors. The example shows this horizontal enveloping for the activities across the two floors for house two.

VERTICAL ENVELOPING where activities are not planned across threads in the bundle, but rather are aggregated only within one thread into tasks. This option might be taken if the size of the involved teams are not large enough to work in multiple floors simultaneously, but rather should finish one floor after the other. The example shows this situation for some tasks for building house one.

MIXED enveloping can of course be applied, a s required for the specific project and its resource management.

For these alternatives for the bundle, FIG. 9 shows the corresponding structures in the work process object (WPO).

Figure 10:
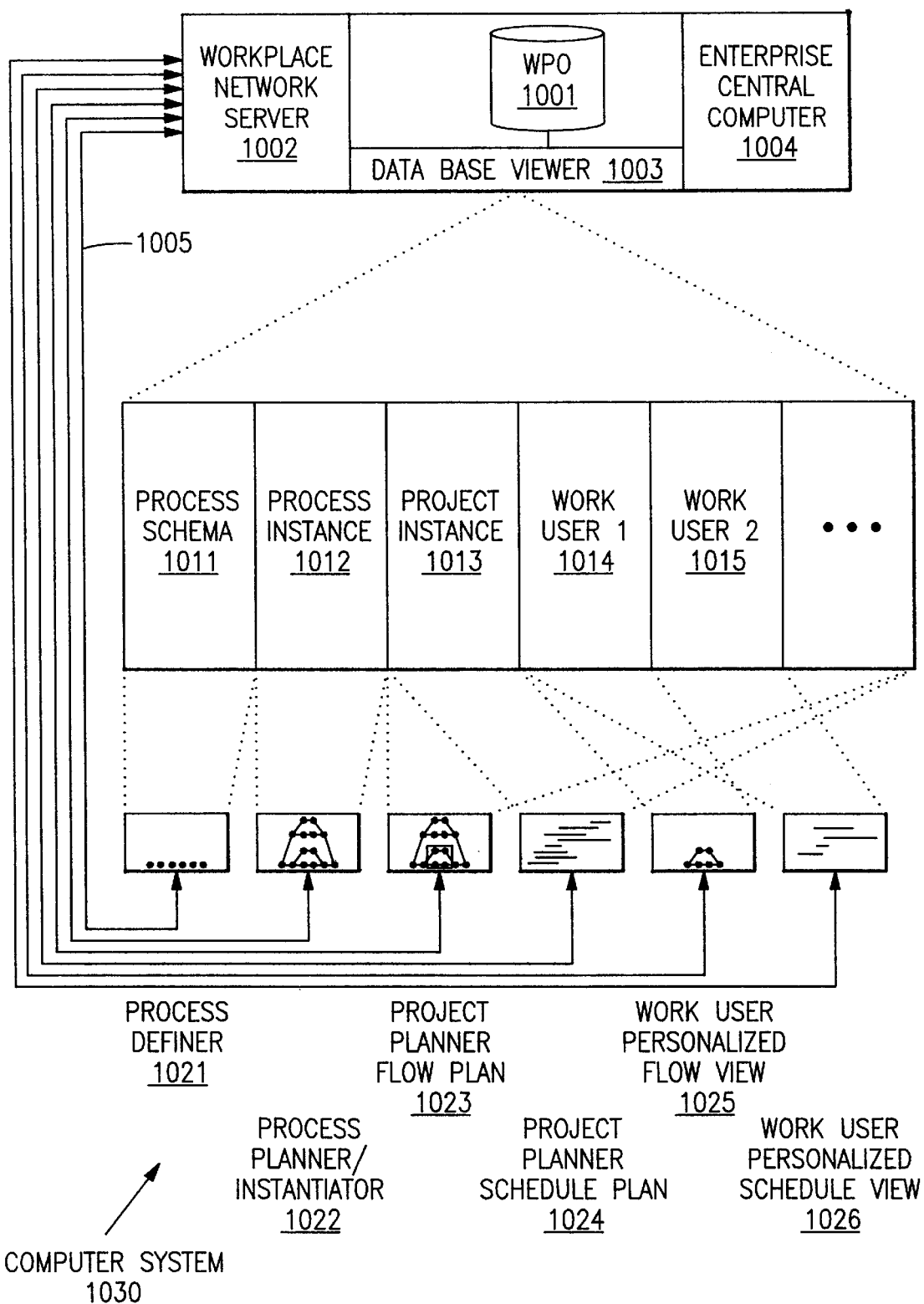
FIG. 10 shows one possible implementation of the concept of the present invention on a computer system.

FIG. 10 shows an example for an implementation of the concept of the present invention.

A central processing unit with the required computing power serves as the central computer system 1030 for the integrated process and project management system for the enterprise. This computer contains in a data base the Work Process Object (WPO) 1001.

This Work Process object (WPO) 1001 contains all static definitions and dynamic execution values for the projects in the enterprise. A workplace network server 1002 in the processing unit provides the communication interfaces 1005 to the individual workstations 1021, 1022, 1023, 1024, 1025, and 1026 of users of this system 1030 so that each individual user is supported with a workplace tailored to the needs of his role in the system 1030.

A data base viewer 1003 implemented in the enterprise central computer 1004 provides the personalized views as required by each user on his workplace on the workstation. The FIG. 10 shows in a schematic way how these views are separated out of the total Work Process Object (WPO) 1001 and how they are displayed on the individual workplaces 1021, 1022, 1023, 1024, 1025, and 1026.

This example has tried to present the essential concepts in the invention in a way that unnecessary detail was omitted and aspects relevant for the invention were stressed. It should be easy for the professional reader to extend the details towards those needed for a full real life project without having to introduce any additional inventive concepts.

We claim:

1. A method for process and project management of a business on a computer system (1030), comprising the steps of:

creating at least one process schema (101) said process schema modeling the execution sequence of activities comprised by said business as a directed graph, and creating a project schema (102) corresponding to said process schema said project schema modeling at least one task comprising a subset of said activities as a unit of work, and generating a process instance (103) derived from said process schema modeling a certain specimen of said business, generating a project instance (104) derived (114) from said process instance (103) and derived (113) from said project schema (102) and said project instance being an executable process and project management instance of said specimen of said business, and creating a work process object (1001) (WPO), said work process object (1001) (WPO) offering combined access to said process schema, to said project schema, to said process instance and to said project instance.

2. The method according to claim 1 further comprising the steps of:

evolving said work process object (1001) (WPO) in stages starting with said creating of said process schema (101) as a first stage, proceeding with said creating of said project schema (102) as a second stage, proceeding with said generating of said process instance (103) as a third stage, proceeding with said generating of said project instance (104) as a fourth stage, proceeding with said executing of said project instance (104) as a fifth stage, and building said stages by applying specifications of each stage to said preceding stages, wherein said specifications are provided by views comprising user dialogs and provided by said process schema, by said project schema, by said process instance and by said project instance respectively.

3. The method according to claim 2, further comprising the steps of:

delimiting in any of said stages, domains of completion of said stages by a domain boundary for stepwise completion of said stage, and defining a number of views providing rules under which said domain boundaries can be moved within said stage, wherein said views are represented by user dialogues for users (1021, 1022, 1023, 1024, 1025, and 1026) involved in said project.

4. The method according to claim 3 wherein the step of creating at least one process schema comprises a step of defining a sub-graph of said directed graph as a bundle of activities, and wherein the step of generating a process instance further includes creating multiple instances of said sub-graph of said bundle of activities said multiple instances of said bundle of activities allowed to be executed in parallel, and delimiting in any of said multiple instances of said bundle of activities domains of completion by a domain boundary for stepwise completion.

5. The method according to claim 1 wherein the step of generating the project schema comprises a step of defining said task by a task envelope, and wherein the step of generating the project instance comprises the step of applying said task envelope to said process instance.

6. The method according to claim 5 wherein said task envelope is a horizontal task envelope comprising activities of said directed graph with a common preceding activity, and wherein said task envelope is a vertical task envelope comprising activities of said directed graph preceding each other.

7. The method according to claim 6 further comprising the step of:

supporting a definition of a degree of overlap of adjacent tasks for activities that could otherwise execute in parallel in said process.

8. The method according to claim 5 wherein said task envelope is a task stack comprising activities of said directed graph forming a loop and wherein each iteration of said loop defines a separate task.

9. The method according to claim 1 further comprising the step of:

presenting a user (1021, 1022, 1023, 1024, 1025, and 1026) of a process and project management computer system an integrated view of process and project management.

10. A computer system (1030) carrying out a method for process and project management according to claim 1, said computer system comprising:

a memory for storing said work process object (1001) (WPO) as a data base commonly used for process and project management;

input means (1002) for entering dialogue information from a user (1021, 1022, 1023, 1024, 1025, and 1026) to said computer system (1030);

output means (1005) for delivering dialogue information from said computer system (1030) to said user (1021, 1022, 1023, 1024, 1025, and 1026); and a processor (1004) for controlling a flow of information between said input means (1002), said output means (1005), and said memory;

wherein said processor (1004) comprises means for reporting all data according to said process and project management to said work process object (1001) (WPO).

11. A computer readable medium storing a computer program for causing a computer system to perform the method according to claim 1.

* * * * *

Disclaimer

6,023,702—Udo Leisten, Stuttgart; Ekkehard Voesch, Aidlingen, both of Germany; Geoff Parncutt, Lillington, United Kingdom; Kurt Bandat, Vienna, Austria. METHOD AND APPARATUS FOR A PROCESS AND PROJECT MANAGEMENT COMPUTER SYSTEM Patent dated Feb. 8, 2000. Disclaimer filed Oct 4, 2006, by the Assignee, International Business Machines Corporation.

Hereby enters this disclaimer to all claims, of said patent.

*(Official Gazette, January 9, 2007)*